United States Patent [19]

Nakamura

[11] Patent Number: 4,637,013
[45] Date of Patent: Jan. 13, 1987

[54] TOKEN EXCHANGE DATA TRANSMISSION SYSTEM HAVING SYSTEM CONFIGURATION DISCRIMINATION

[75] Inventor: Yasuo Nakamura, Fuchu, Japan

[73] Assignee: Canon Kabushiki Kaisha, Tokyo, Japan

[21] Appl. No.: 625,823

[22] Filed: Jun. 28, 1984

[30] Foreign Application Priority Data

Jul. 5, 1983 [JP] Japan .................. 58-121056
Jul. 5, 1983 [JP] Japan .................. 58-121057
Jul. 5, 1983 [JP] Japan .................. 58-121058
Oct. 5, 1983 [JP] Japan .................. 58-185084
Oct. 5, 1983 [JP] Japan .................. 58-185085

[51] Int. Cl.$^4$ ............... H04J 3/02; H04J 3/16
[52] U.S. Cl. ....................... 370/85; 370/89
[58] Field of Search ........ 370/85, 86, 90, 89; 340/825.05, 825.06, 825.08

[56] References Cited

U.S. PATENT DOCUMENTS

| | | | |
|---|---|---|---|
| 4,410,985 | 10/1983 | Yasumoto et al. | 370/86 |
| 4,495,493 | 1/1985 | Segarra et al. | 370/86 |
| 4,530,092 | 7/1985 | Hafer | 370/85 |
| 4,542,501 | 9/1985 | Chevalet et al. | 370/85 |

Primary Examiner—Douglas W. Olms
Assistant Examiner—Frank M. Scutch, III
Attorney, Agent, or Firm—Fitzpatrick, Cella, Harper & Scinto

[57] ABSTRACT

A data transmission system for a LAN has a number of nodes connected in a ring or bus network. Each node has a transmit-receive circuit, a RAM, a CPU, a self node address switch, and an interface control. The frequency of adjacent node retrieval processing operation is set to be high in an initial period after the node is powered, and is set to be low thereafter. A new node added to the network can obtain a communication right within a relatively short period of time. Each node or the system can also have a maximum node address switch to allow the CPU to discriminate the current maximum address within the network. A node to be assigned with the communication right next can be discriminated fast. First and second downstream node addresses can also be stored in the RAM to allow the node to assign the communication right to the second downstream node in case the first downstream node has failed due to power failure or the like. Node address management can be performed by adding a sending origin address to the communication right, so that each node can discriminate the system configuration.

30 Claims, 35 Drawing Figures

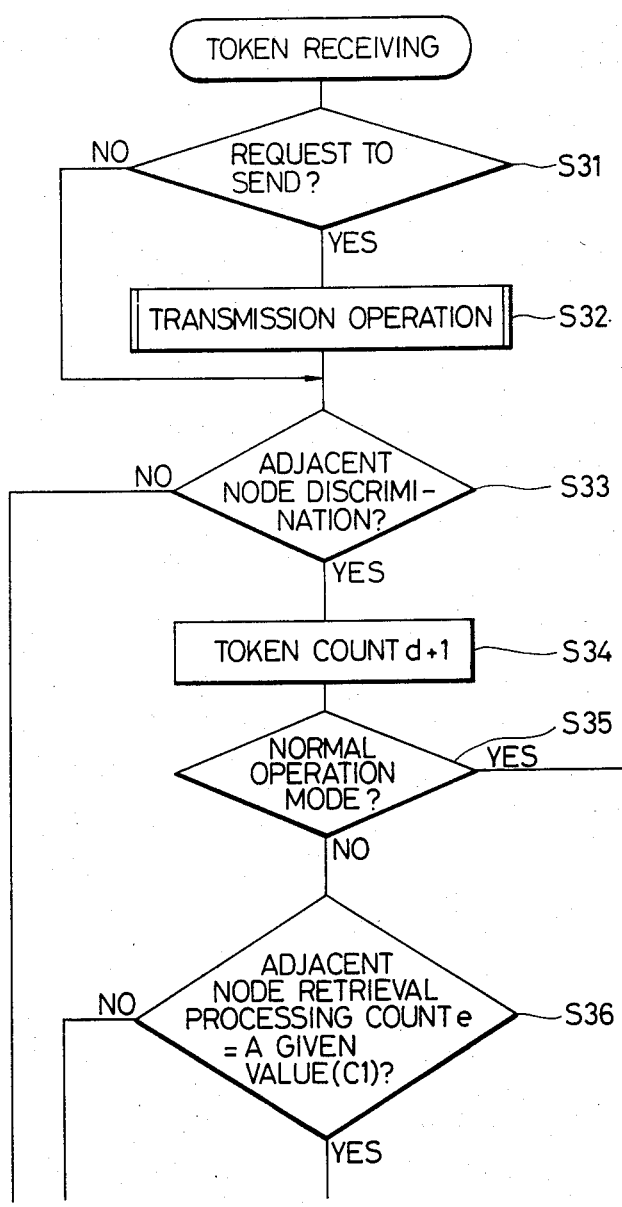
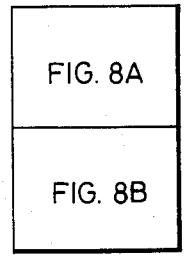
FIG. 8A
FIG. 8

FIG. 15

| ADDRESS | CONTENT | |
|---|---|---|
| | ⋮ | 46 |
| A | 1ST DOWN STREAM NODE DISCRIMINATION FLAG a | Aa |
| B | 1ST DOWN STREAM NODE ADDRESS b | Ab |
| C | 2ND DOWN STREAM NODE DISCRIMINATION FLAG c | Ac |
| D | 2ND DOWN STREAM NODE ADDRESS d | Ad |
| | ⋮ | |

FIG. 16

| FRAME CONTROL | DESTINATION ADDRESS | ADDRESS OF SENDING ORIGIN | DATA |
|---|---|---|---|
| 55 | 56 | 57 | 58 |

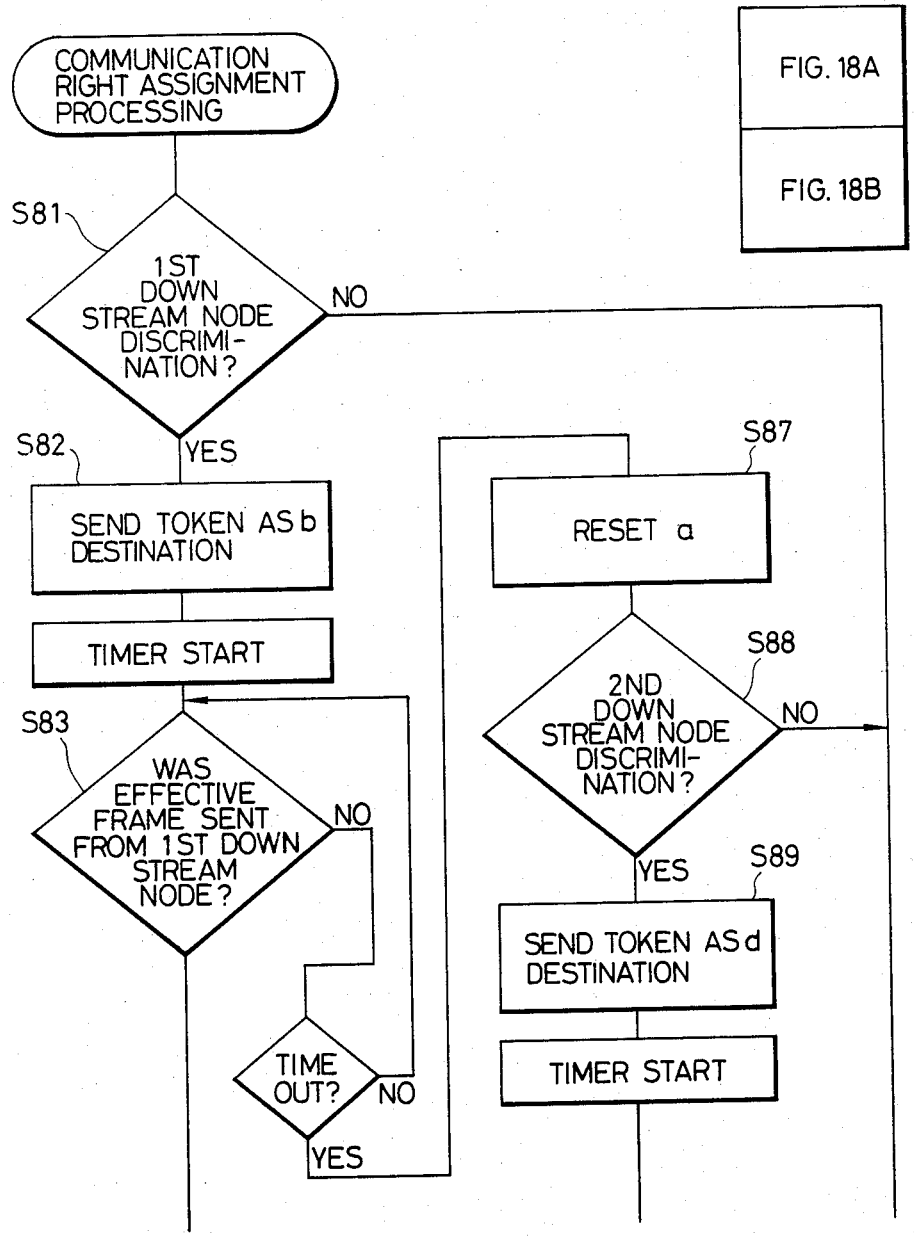

FIG. 28

| START ADDRESS | CONTENT OF RAM 16 | |
|---|---|---|
| ⋮ | ⋮ | |
| A | NODE TOTAL COUNT a | — Aa |
| B₁ | 1ST NODE ADDRESS b₁ | — Ab₁ |
| B₂ | 2ND NODE ADDRESS b₂ | — Ab₂ |
| B₃ | 3RD NODE ADDRESS b₃ | — Ab₃ |
| ⋮ | ⋮ | |
| Bₙ | nTH NODE ADDRESS bₙ | — Abₙ |
| ⋮ | ⋮ | |

| DESTINATION ADDRESS | ADDRESS OF SENDING ORIGIN | DATA |
|---|---|---|
| 121 | 122 | 123 |

TOKEN EXCHANGE DATA TRANSMISSION SYSTEM HAVING SYSTEM CONFIGURATION DISCRIMINATION

BACKGROUND OF THE INVENTION

1. Field of the Invention

The present invention relates to a data transmission system for performing data transmission among a plurality of nodes connected thereto and, more particularly, to a data transmission system suitable for use as a LAN (local area network).

2. Description of the Prior Art

An LAN connecting a plurality of business machines such as word processors, office computers or printers through a low-cost and simple communication network recently has been receiving a great deal of attention and is now increasingly found in practical use.

Such a LAN must satisfy the requirements of easy installation, easy expansion/reduction of the network, and compatibility with as many different types of machine as possible. Therefore, if an existing computer network is used for this purpose, all these requirements cannot be satisfied at the same time and high data transmission efficiency cannot be achieved.

A token passing system is one type of communication control system used for such LANs. According to this system, a special packet called a "token," which represents a logical communication right to the network, is sent from one node to another connected to the network such that only the node which has acquired this token has access to the communication right. According to this token passing system, only a single node can send the desired data within a single time slot. For this reason, a communication disturbance, i.e., a "collision" or "contention", never occurs.

This token passing system is further divided into the token ring system and the token bus system in accordance with a difference in the exchange or assignment method of passing the token.

Acccording to the token ring system, the token is sequentially assigned to physically adjacent nodes. In contrast, according to the token bus system, the token is sequentially assigned to logically adjacent nodes, that is, to nodes having the closest node (logical) addresses.

For the reason described above, the shape of the network is limited to a ring network in the token ring system. However, the shape of the network can be a ring or bus (multidrop) network in the token bus system.

In the token bus system, when a token is to be sent, a destination address must be added to the token. Therefore, the sending origin must retrieve the address of a node which is to receive the token. This retrieval processing will be referred to hereinafter as "adjacent node retrieval processing".

In a network control system utilizing the conventional token bus system, once an adjacent node address is discriminated, the adjacent node retrieval processing is not performed in subsequent communication assignment processing, and the communication assignment processing is performed thereafter in accordance with the destination address which is already determined. However, when a node having the destination address becomes inoperative due to power failure or the like during operation of the network and another node is rendered operative in place of this inoperative node, the adjacent node retrieval processing is executed after completing every predetermined number of communication right assignment processing operations so as to retrieve the new adjacent node.

In the conventional case, the predetermined number of communication right assignment processing operations, after which the adjacent node retrieval processing is performed, is fixed so that the system is subject to the following disadvantages.

(1) When the predetermined number is relatively small, the frequency of executing the adjacent node retrieval processing operations during communication becomes high, so that the communication efficiency is low.

(2) When the predetermined number is relatively great, the frequency of the adjacent node retrieval processing performed during communication is low, so that it takes a long period of time before a token is received by a node which has been added to the network.

In a token bus system, the number of nodes connected in the network does not generally coincide with the number of addressable nodes. When the actual number of nodes is small, unncessary node retrieval processing is repeatedly performed to decrease the transmission efficiency.

In a data control system utilizing a conventional token bus system, once an adjacent node address is discriminated, node retrieval processing is not used for the subsequent communication assignment processing, and communication assignment processing is performed in accordance with the discriminated destination address. However, when the node having this destination address is rendered inoperative due to power failure or the like during operation of the network, normal communication right assignment cannot be performed. Then, the node retrieval processing is performed for the first time at this point for retrieval of the next adjacent node. This processing will be referred to hereinafter as a "downstream node fault recovery processing". However, if the addresses of nodes constituting a network are greatly spaced apart, the down stream node fault recovery processing time is long, thus decreasing the communication efficiency of the network.

When a node which has acquired a communication right wants to send data to another node, a corresponding destination address is generally added to the data to be sent. In order to determine the destination address, some means must be used to recognize the system configuration within the network. In other words, each node must be able to discriminate the addresses of the remaining nodes in the network.

SUMMARY OF THE INVENTION

The present invention has been made in consideration of this and has as its object to provide a data transmission system which has a simple system configuration and which is capable of high-efficiency data transmission.

It is another object of the present invention to provide a data transmission system suitable for use as an LAN.

It is still another object of the present invention to provide a data transmission system which can effectively perform exchange of a token in data transmission in accordance with the token passing system.

It is still another object of the present invention to provide a data transmission system which has flexibility to respond to future demands for expansion/reduction of the network and is capable of high efficiency data transmission.

It is still another object of the present invention to provide a data transmission system which can reliably and easily discriminate other nodes constituting the network.

The above and other objects and features of the present invention will become apparent from the following description taken in conjunction with the accompanying drawings.

BRIEF DESCRIPTION OF THE DRAWINGS

FIGS. 7 and 8 8a and 8b are flow charts showing an example of communication right assignment processing;

FIG. 15 shows a table of an area in the memory shown in FIG. 14;

FIG. 16 shows the data format of communication data used by the transmit-receive device shown in FIG. 14;

FIGS. 18 18a and 18b are flow charts showing an example of the communication right assignment processing in the embodiment shown in FIG. 14;

FIG. 28 shows a system configuration table of the node shown in FIG. 27;

FIG. 29 shows the format of communication data;

DETAILED DESCRIPTION OF THE PREFERRED EMBODIMENTS

The present invention will now be described in detail with reference to the accompanying drawings.

Figure 1:
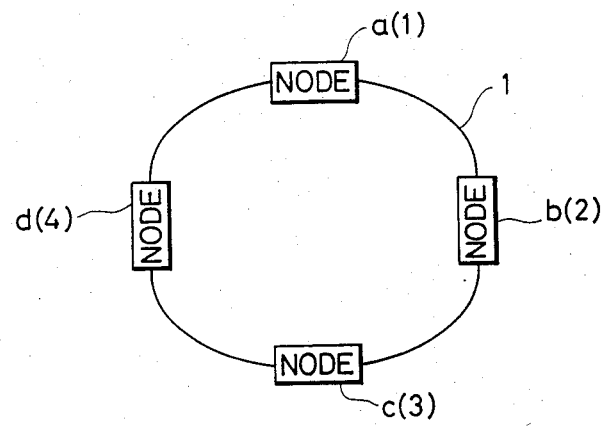
FIG. 1 is a diagram showing an example of a configuration of a ring network.
Figure 2:
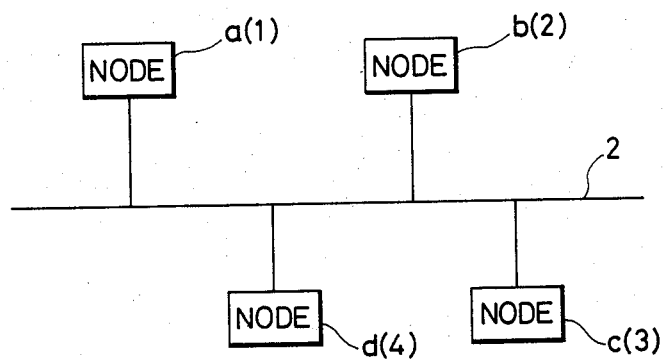
FIG. 2 is a diagram showing an example of a bus (multidrop) network.

FIGS. 1 and 2 show schematic configurations of a data transmission system to which the present invention can be applied.

FIG. 1 shows a ring network 1, while FIG. 2 shows a bus (multidrop) network 2, each having transmit/-receive nodes a(1), b(2), c(3) and d(4). Numerals in brackets of the symbols designating the nodes represent the addresses asssigned to the respective nodes.

In a data transmission system having such a configuration, data transmission between nodes is performed in accordance with the token passing system.

As has been described above, the token passing system is classified into the token ring system and the token bus system in accordance with the difference in the token exchange method.

According to the token ring system, the token is sequentially sent to physically adjacent nodes. In contrast to this, according to the token bus system, the token is sequentially sent to logically adjacent nodes, that is, to nodes having the closest node addresses.

Therefore, the token ring system is limited to a ring network as shown in FIG. 1, whereas the token bus system can be applied to a ring or bus network as shown in FIG. 2.

According to this embodiment of the present invention, the token bus system is adopted for this reason. In the data transmission systems shown in FIGS. 1 and 2, the token is sent in the order of nodes a(1), b(2), c(3), d(4), a(1), and so on.

Figure 3:
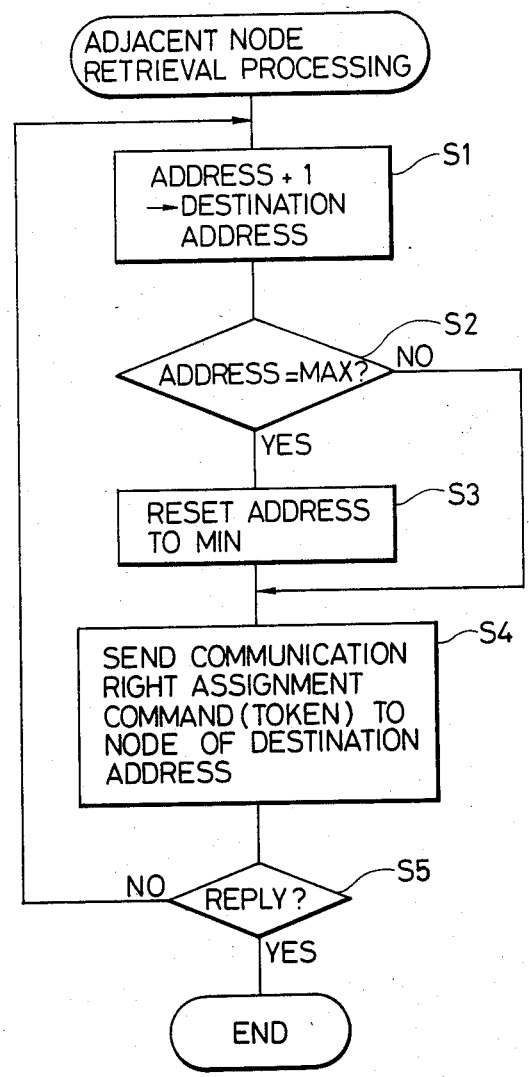
FIG. 3 is a flow chart showing an example of adjacent node retrieval processing.

In the token bus system, when a token is sent, a destination address must be added so that each node must retrieve the address of a node to which the token is to be assigned. This node retrieval is performed in accordance with the following steps (1) to (3), as shown in FIG. 3. These procedures are stored as firmware in the control section of each node.

(1) A destination address is obtained by adding a predetermined value, e.g., 1 to the self node address (step S1). This is added to a communication assignment command as a token (step S4). If it is determined in step S5 that no reply, representing that the node to be given the communication right has received the command, has been received within a given time period, it is decided that no node having such a destination address is present in the network or if there is one, it is in an inoperative state due to power failure or the like. Upon deciding this, the above loop is repeated until a reply is received from the designated loop.

(2) If it is finally determined in step S2 that no reply is received even after the destination address has reached the maximum node address of the network, the destination address is set to a minimum node address of the network (step S3), and a communication right assignment command is sent (step S4).

(3) When there are more than two operative nodes in the network, the reply can always be received in step S4, as described in items (1) and (2) above. When the reply is received in this manner (step S5), the communication assignment processing is ended. The destination address at this time is a node address of a node to which the token is to be assigned.

A series of these processing operations will be defined, hereinafter as the "adjacent node retrieval processing".

Figure 4:
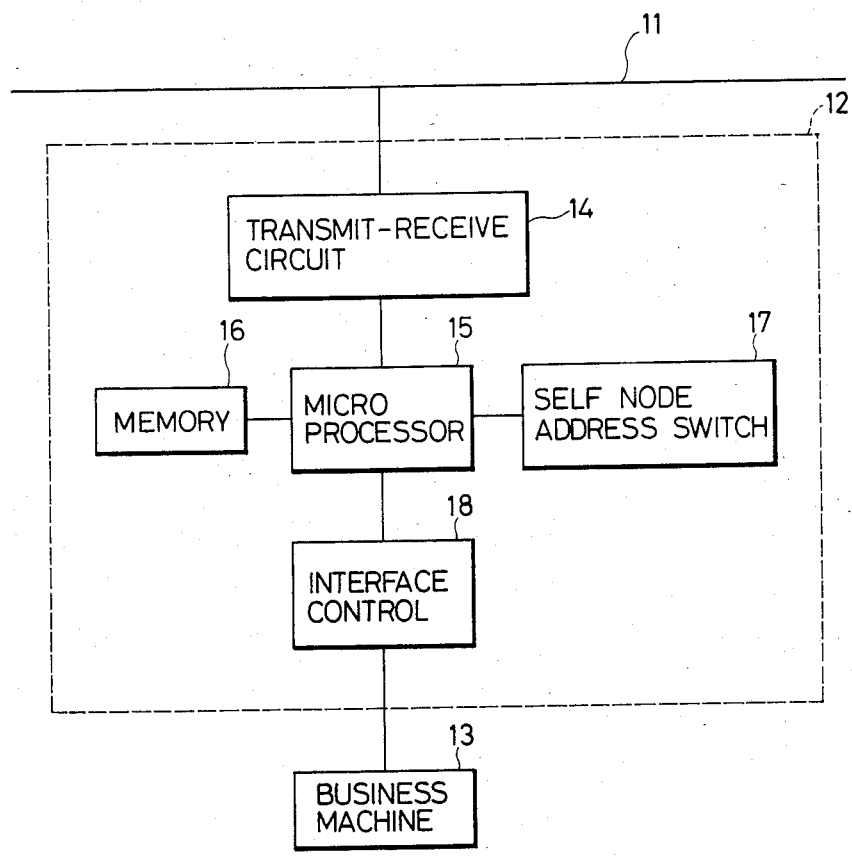
FIG. 4 is a block diagram showing an example of a configuration of a node.

FIG. 4 shows a first embodiment of the configuration of a node according to the present invention. Referring to FIG. 4, various types of business machines 13 are connected to a node 12 which, in turn are connected to a network communication link or path 11.

The node 12 has a transmit-receive circuit 14, a microprocessor 15 which stores firmware therein and which controls the overall node using this firmware, a memory (RAM) 16 storing various types of information, a self node address switch 17 for designating the self node address, and an interface control 18 for performing input/output control of the business machines 13.

Figure 5:
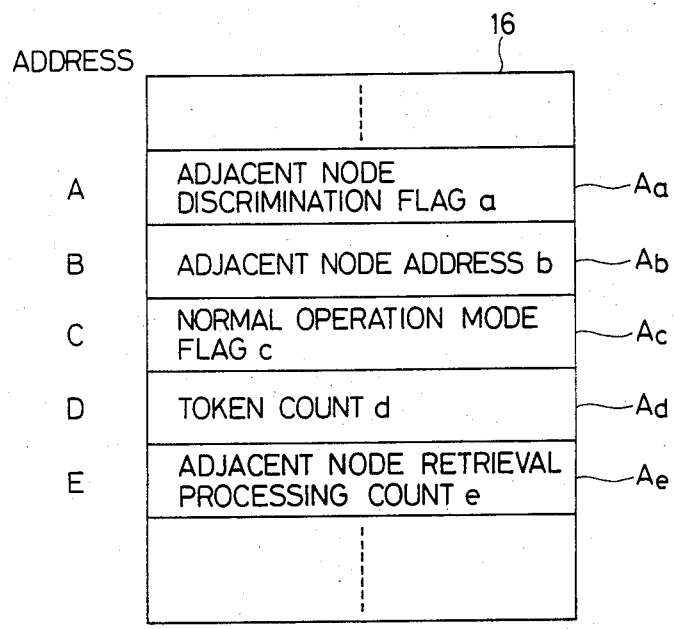
FIG. 5 shows a table of areas of a memory.

FIG. 5 shows memory areas allocated in the RAM 16. Referring to FIG. 5, an adjacent node discrimination flag a, which represents the adjacent node is discriminated upon the adjacent node retrieval processing stored in an area Aa. An adjacent node address b representing the address of the discriminated adjacent node is stored in an area Ab. A normal operation mode flag c indicating that the normal operation mode has been started a predetermined period of time after the power of the node is turned on is stored in an area Ac. A token count d representing the number of communication right assignment commands (tokens) received is stored in an area Ad. An adjacent node retrieval processing count e representing the number of adjacent node retrieval processing operations performed is stored in an area Ae. Note that the capital letters A through E at the left of each symbol representing each area represent the addresses of the corresponding areas.

The area Ad for storing the token count d and the area Ae for storing the adjacent node retrieval count e are respectively used as first and second counting means.

Figure 6:
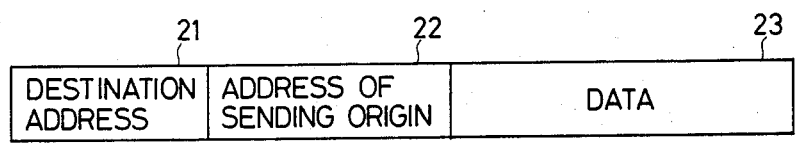
FIG. 6 shows an example of the format of communication or send data.

FIG. 6 shows an example of the format of communication data used in this embodiment. The format includes a data field 21 for writing a destination address, a data field 22 for writing a sending origin address, and a data field 23 for writing communication control commands such as a communication right assignment command and various data such as bit images or character codes.

The example of processing in the node shown in FIG. 4 will be described with reference to FIGS. 7 and 8. The processing program for this purpose is stored in the micrprocessor 15 as firmware.

Figure 7:
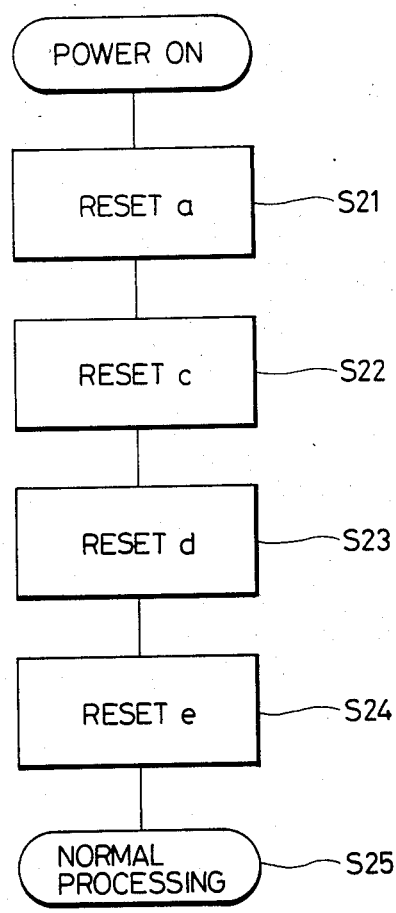

As shown in FIG. 7, when the power of the node 12 is turned on, the adjacent node discrimination flag a, the normal operation mode flag c, the token count d, and the adjacent node retrieval processing count e of the RAM 16 are reset in steps S21, S22, S23 and S24, respectively. In step S25, the microprocessor 15 performs the normal processing and awaits a communication right assignment command to be received through the network communication path 11. The data of the communication right assignment command has the destination address added thereto. Therefore, when the destination address of the received data coincides with the self address designated by the self node address switch 17, it is determined that this node has been assigned the token (communication right).

Processing upon reception of the token in this manner will now be described with reference to FIG. 8.

After reception of the token, the node checks or discriminates in step S31 if there is a request to send from this node. If YES is indicated in step S31, the necessary transmission operation is performed in step S32. When the transmission operation is completed in step S32 or when NO is indicated in step S31, the following processing is performed so as to send the token to an adjacent node.

It is first checked in step S33 if the adjacent node discrimination flag a is set so as to determine if the node address to receive the token is registered already. Immediately after the power is turned on or the like, the adjacent node discrimination flag a is reset to "0". Therefore, a NO indication is obtained in step S33, and the flow advances to step S40 to perform the next adjacent node retrieval processing. This processing is performed in accordance with the procedures shown in FIG. 3. In step S41, the adjacent retrieval processing count e is incremented by 1. This adjacent retrieval processing count e is used as a means for checking if the node has been set to the normal operation mode from the initial state.

In step S42, the adjacent node address b discriminated in the adjacent node retrieval processing is stored in the area Ab. In step S43, the adjacent node discrimination flag a is set to "1". In step S44, the token is sent after adding the adjacent node address b as a destination address, thereby completing the token assignment processing.

The communication right assignment command after the adjacent node is discriminated will be described below.

Since the adjacent node discrimination flag a is determined to be set to "1" (i.e., YES) in step S33, the flow advances to step S34 wherein the token count d is incremented by 1. Thereafter, in order to increase the communication efficiency, the value of the registered adjacent node address b is set at the destination address (step S46), and the token is sent (step S44). However, if NO is indicated in step 33 (since a new node has been included in the network or the like), the adjacent node retrieval processing (step S40) is performed. This adjacent node retrieval processing is performed at a constant period. This period is different in accordance with the two following modes.

The first mode is the non-normal operation mode. This mode corresponds to a case existing before a predetermined period of time has elapsed after the power of the node is turned on. This mode is set when the normal operation mode flag c is determined to be reset to "0" in step S35. In this mode, if it is determined in step S38 that the token count d has reached a given value c2 preset in the network, the flow advances through step S39 to step S40 for performing the adjacent node retrieval processing.

The second mode is the normal operation mode. This mode corresponds to case wherein the adjacent node retrieval processing count e incremented in step S41 is determined to have reached a given value c1 in step S36 and the normal operation mode flag c is determined to have been set to "1" in step S37. In this mode, if it is determined in step S45 that the token count d has reached a given value c3 present in the network, the flow advances through step S39 to step S40 for performing the adjacent node retrieval processing.

In this processing, if the given value c2 is preset to be smaller than the given value c3, the frequency of the adjacent node retrieval processing can be increased for a predetermined period of time after the power of the node is turned on, while the frequency of the adjacent node retrieval processing is lowered after this predetermined period of time has elapsed.

Figure 8B:
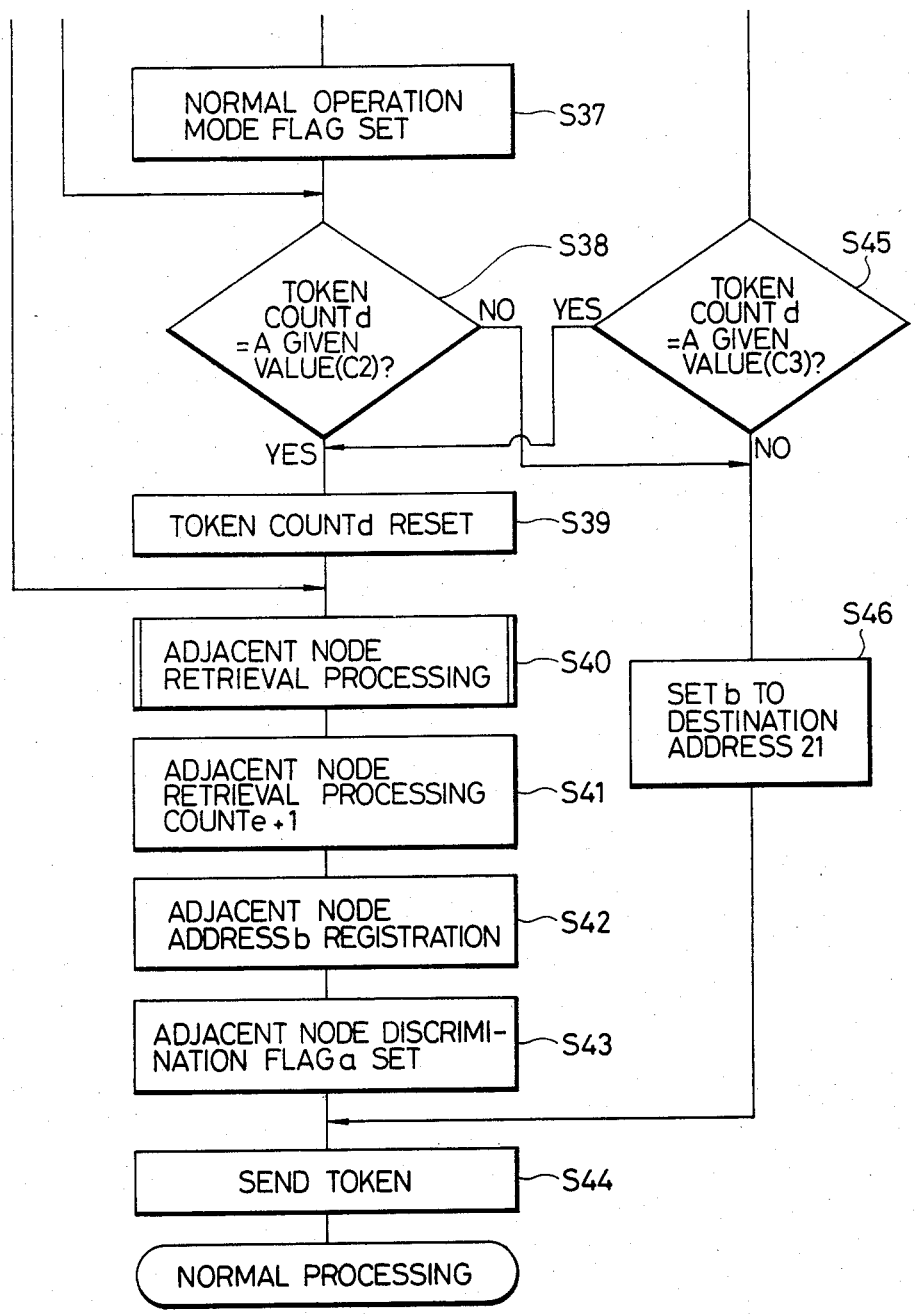
Figure 9:
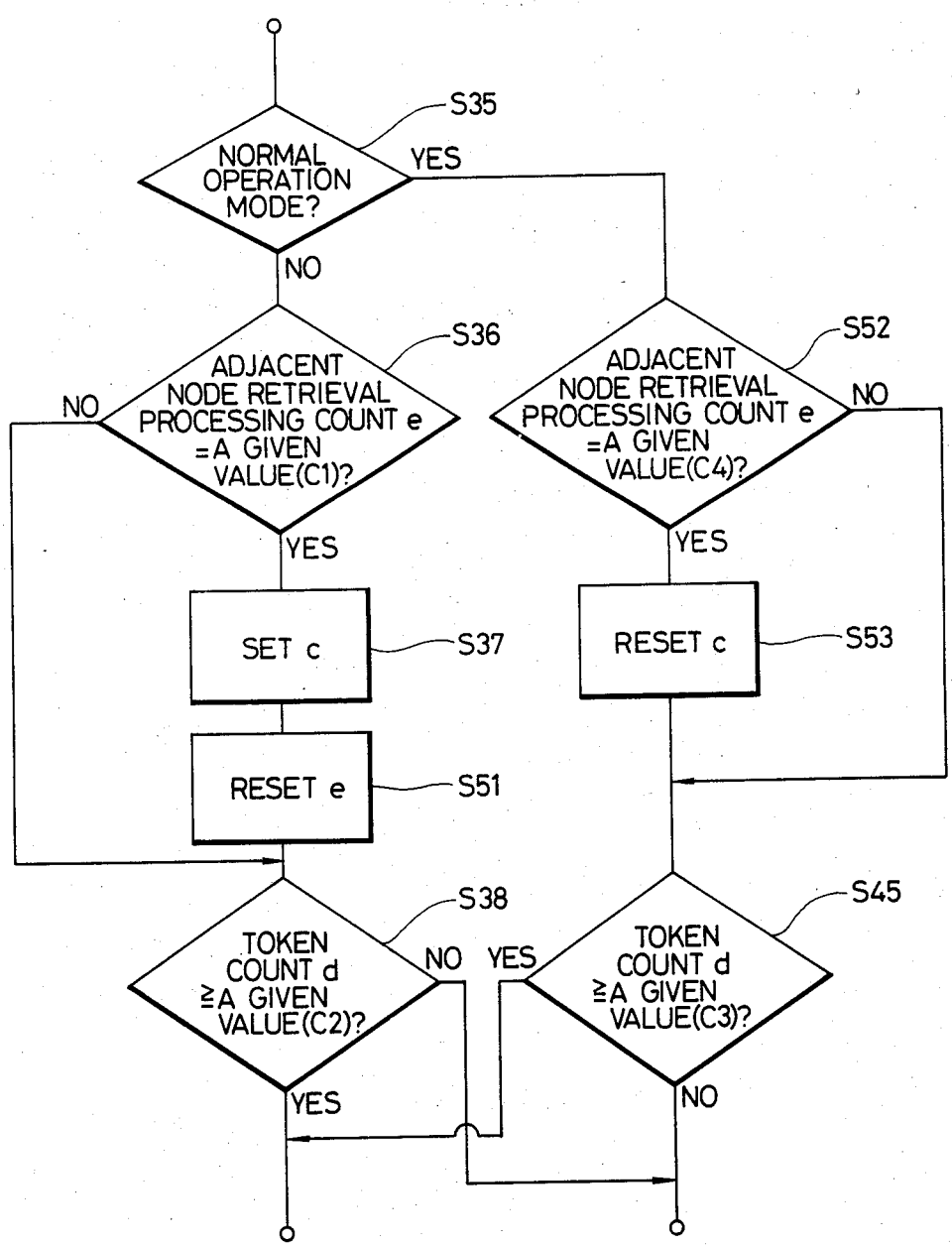
FIG. 9 is a flow chart showing another example of the communication right assignment processing.

The flow shown in FIG. 8 can be modified as shown in FIG. 9. According to the flow shown in FIG. 9, step S51 for resetting the adjacent node retrieval processing count e is inserted between steps S37 and S38. Step S52 for discriminating if the count e has reached a given value c4 preset for the network, and step S53 for resetting the normal operation mode flag c when YES in step S52 are inserted between steps S35 and S45. With this sequence flow, when the adjacent node retrieval processing count e has reached the given value c4 the predetermined period of time after the normal operation mode is started, the normal operation mode flag c is reset in step S53. In this manner, the frequency of the adjacent node retrieval processing can be increased.

The given values c1 to c4 can be provided in each node in a system which has a monitor node which controls the overall network. However, in a system which does not have such a monitor node, the given values c1 to c4 can be separately preset in each node. Note, however, that the given values c1 to c4 are conveniently stored in the RAM 16.

According to the embodiment described above, the frequency of the adjacent node retrieval processing is set to be high in the initial state within a predetermined period of time after the power of the node is turned on. In the normal operation mode after this predetermined period of time has elapsed, the frequency of the adjacent node retrieval processing is set to be low. Accordingly, with the system of the present invention, the communication efficiency is high. The present invention can thus realize a network control system wherein a new node included in the network can acquire a communication right within a short period of time.

With reference to step S2 in the flow shown in FIG. 3, the "preset maximum node address in the network" deviates, in general, from the "actual maximum node address in the network". This is because when the number of nodes is changed due to expansion/reduction of the network, the number of addresses of the nodes constituting the network also changes.

The "preset maximum node address in the network" is defined by the bit width of the destination address field in the data format shown in FIG. 6. For example, when the destination address has an 8-bit width, the maximum node address which can be set for a predetermined node is 254. When all the 8 bits are "1", the value 255 is used as a global address wherein some data is simultaneously sent to all the nodes in the network; it is therefore not used as an individual node address.

The "actual maximum address in the network" can take various values within the range of 0 to 254 in accordance with the system configuration of each node included in the network. For example, in a system configuration according to the token bus system as shown in FIG. 2, when the node d(4) having a maximum node address "4" wants to assign the token to the logically adjacent node a(1), it can find the desired node a(1) only after transmitting the communication right assignment command varying the destination address within the range of 5 to 255 and 0.

Therefore, the system is defective in that a time period (node retrieval time) required for a node which has a maximum node address within the network to retrieve a node which is to be assigned the token therefrom is long.

An embodiment of a data transmission system which is free from this defect and which can improve the communication efficiency will be described below.

Figure 10:
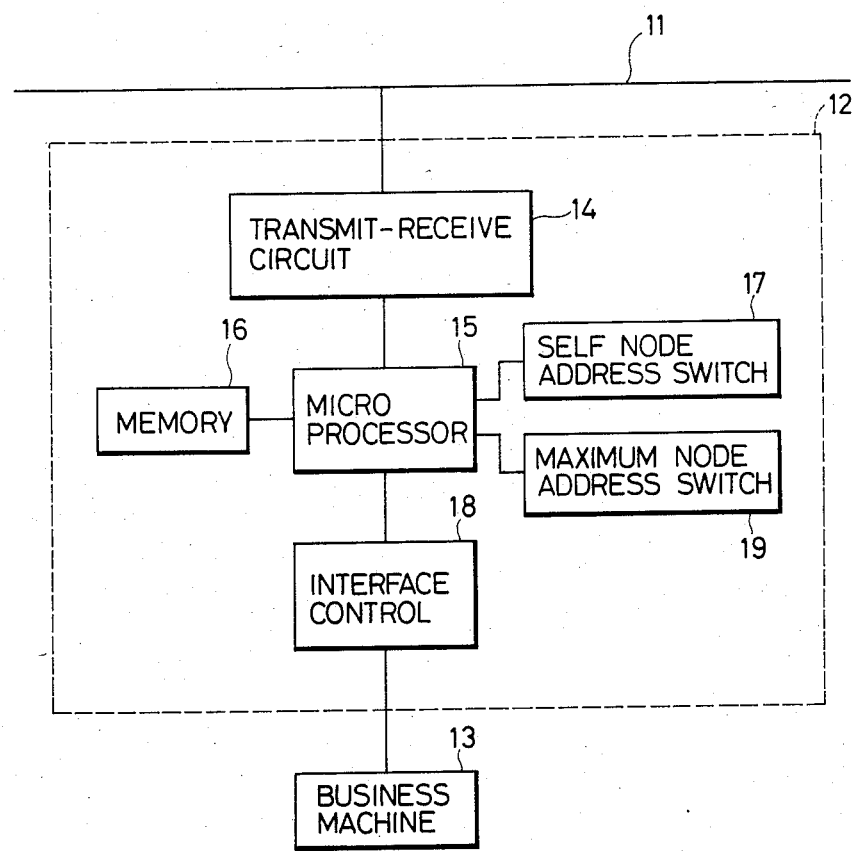
FIG. 10 is a block diagram showing another example of the configuration of a node.

FIG. 10 shows a second embodiment of the configuration of a node according to the present invention. As in the case of the system shown in FIG. 4, various business machines 13 are connected to a transmit-receive node 12 which, in turn, is connected to a network communication link or path 11.

The node 12 has a transmit-receive circuit 14, a microprocessor 15 for storing firmware inside and for controlling the overall node using this firmware, a memory (RAM) 16 for storing various data, a self node address switch 17 for designating the self node address, and an interface control 18 for performing input/output control of the business machines 13. The node 12 shown in FIG. 10 is different from that shown in FIG. 4 in that it additionally has a maximum node address switch 19 comprising a DIP switch or the like for designating the maximum node address in the network.

Figure 11:
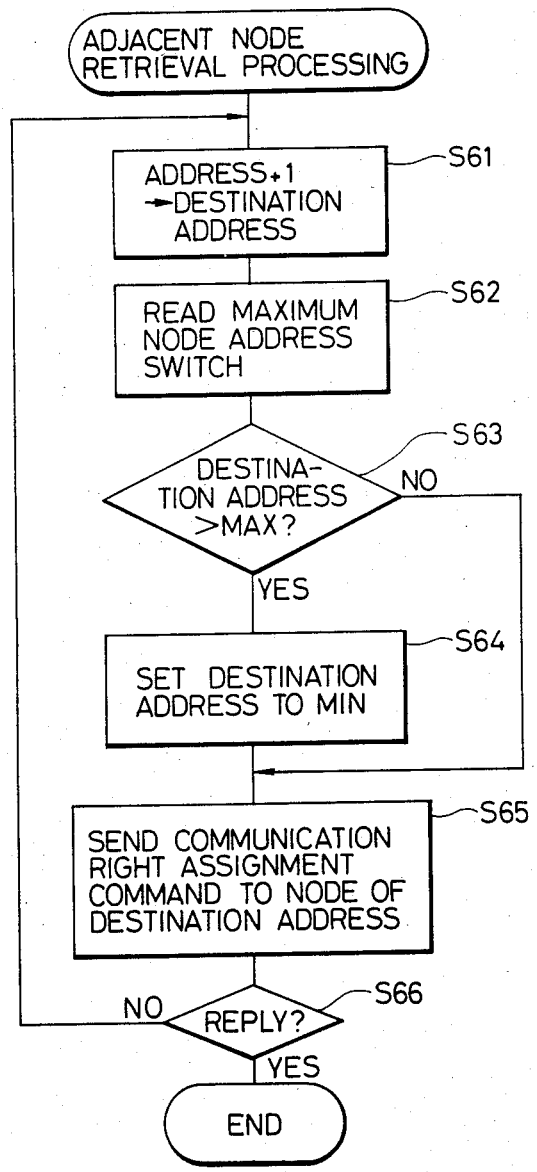
FIG. 11 is a flow chart showing another example of the communication right assignment processing.

An example of a token (communication right) assignment processing, i.e., the adjacent node retrieval processing according to the system of this embodiment will now be described with reference to FIG. 11. The operation flow shown in FIG. 11 is basically the same as that shown in FIG. 3, and this flow is stored as firmware in the microprocessor 15.

When the communication right is assigned from one node to another, the sending origin node reads the value of the self node address switch 17 and prepares the designation address by adding 1 to the read out self node address in step S61. In step S62, the node reads the value of the maximum node address switch 19. It is then checked in step S63 if the designation address obtained in step S61 is larger than the read maximum node address. If YES is indicated in step S63, the flow advances to step S64 to set the destination address at the minimum node address. The flow then advances to step S65. However, if NO is indicated in step S63, the flow immediately advances to step S65.

In step S65, the communication right assignment command including the destination address prepared in step S61 is transmitted. The flow then advances to step S66. When it is determined in step S66 that a reply (reply communication data) representing the command has been received is not received within a predetermined period of time, the flow returns to step S61. In step S61, the destination address is incremented by 1 again, and the same operation as described above is repeated. When the reply is finally received, the communication right assignment processing is terminated.

If the maximum node address is set to be "4" using the maximum node address switch 19 in the node d(4) having the maximum node address "4" within the network, wasteful processing of transmitting a communication right assignment command to nodes having addresses of 5 or more which do not really exist can be omitted.

When a new node having a node address "5" is added as a result of system expansion, the maximum node address can be updated to "5" by means of the maximum node address switch 19. Only with this operation can the normal operation be continued without requiring any change in the firmware for communication control stored in the RAM of the node.

In the embodiment described above, each node of the network has a maximum node address designating switch. However, only a single node within the network can have a maximum node address designating switch. In this case, this node serves to signal the current maximum node address to other nodes which do not have such a switch.

According to the embodiment of the present invention described above, since a node having a maximum node address within the network and capable of communication can discriminate a node to receive the communication right with high efficiency irrespective of the size of the overall system, high-speed communication right assignment processing can be performed.

Figure 12:
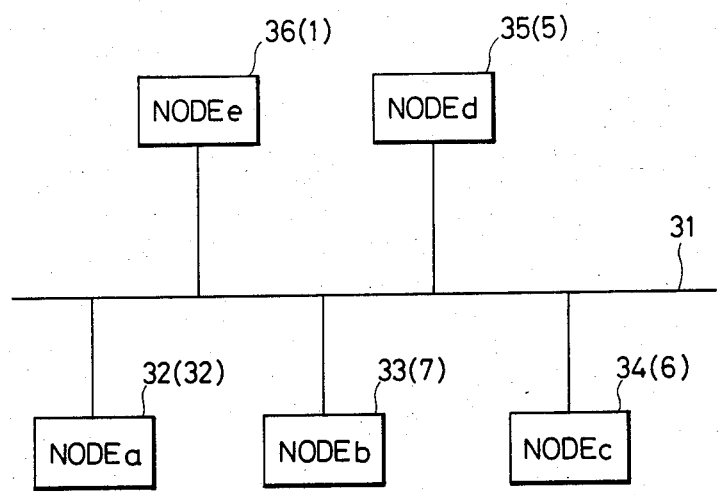
FIG. 12 is a diagram showing another configuration of an LAN.

Assume that the data transmission system has a bus network configuration as shown in FIG. 12.

Referring to FIG. 12, nodes a or 32(32), b or 33(7), c or 34(6), d or 35(5), or e or 36(1) are connected to a communication link or path 31. In the symbols denoting the respective nodes, the numerals in brackets denote the addresses assigned to the corresponding nodes.

Figure 13:
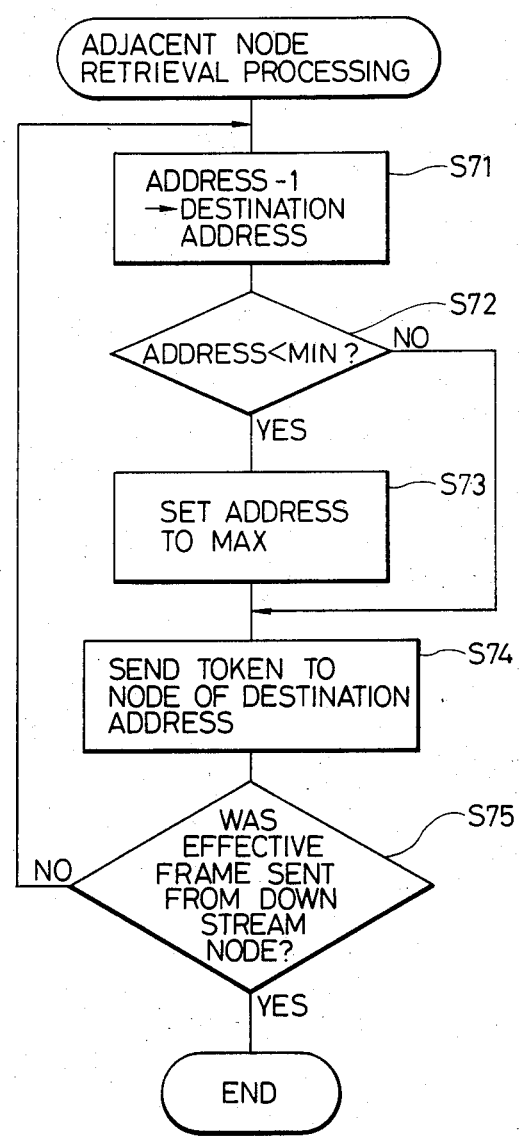
FIG. 13 is a flow chart showing another example of the adjacent node retrieval processing.

In the network shown in FIG. 12, a token is sent in the order of the nodes a(32), b(7), c(6), d(5), and e(1). Unlike in the first and second embodiments of the present invention, the token is sent from a node to another which has a smaller address. As has been described above, in the token bus system, when the token is sent from one node to another, the destination address must be added to the token. Therefore, each node must retrieve the address of a node which is to receive the token (to be referred to as a downstream node hereinafter). Such adjacent node retrieval processing is performed in accordance with the following procedures (1) to (3) according to the flow chart shown in FIG. 13:

(1) A destination address is calculated by subtracting a predetermined value, for example, 1 from the self node address (step S71). The calculated destination address is added to the communication right assignment command, and the communication right assignment command is sent (step S74). If an effective frame is not received from the downstream node to receive the token within a predetermined period of time (step S75), it is determined that either the node having the corresponding destination address does not exist or the node having this destination address is inoperative due to power failure or the like. The flow then returns to step S71 and the same loop is repeated until the effective frame is received from the downstream node.

(2) If the effective frame is not received from the downstream node even after the destination address has reached the minimum node address preset in the network (step S72), the destination address is reset to the maximum node address preset in the network (step S73) and the token is transmitted to a node having the maximum node address (step S74).

(3) If there are 2 or more operative nodes present in the network, the effective frame (including the communication right assignment command) is always sent back from the downstream node in response to the transmission operation in step S74 described in items (1) and (2) above. When the returned effective frame is detected (step S75), the communication right assignment processing is terminated.

The destination address at this time is given as a node address of a node which is to receive the token. A series of operations described above is defined hereinafter as "adjacent node retrieval processing".

In a data transmission control system utilizing the token bus system, as has been described above, when the downstream node address is discriminated, the adjacent node retrieval processing is not performed during the subsequent communication right assignment processing. Thus, the subsequent communication right assignment processing is performed using the address which has been discriminated, thereby improving the communication efficiency. When the downstream node becomes inoperative due to power failure or the like during the operation of the network, the assignment of the communication right cannot be performed normally. Then, the adjacent node retrieval processing is performed again to retrieve the next downstream node. This processing is defined as "downstream node fault recovery processing".

However, with this system configuration, the more the address numbers of the respective nodes are separated from each other, the longer it takes to complete the downstream node fault recovery processing. For example, assume that the token transmission order is set to be addresses NA, NB and NC. If the node having the address NB fails, time TS required for the node having the address NA to retrieve the node having the address NC which is the correct downstream node therefor is given by:

$$TS = (Ti + TO) \times (NA - NC - 1) + Ti \quad (1)$$

where Ti is the token transmission processing time, TO is the time out time for awaiting a reply to determine an inoperative node, and NA and NC are node addresses, respectively.

The time TS for NA < NC is given by:

$$TS = (Ti + TO) \times \{(NA - N_{MIN}) + (N_{MAX} - NC)\} + Ti \quad (2)$$

where $N_{MIN}$ is the minimum node address and $N_{MAX}$ is the maximum node address which are preset in the network.

When it is assumed that TO=10 ms, $N_{MIN}=1$, and $N_{MAX}=32$, and the value of Ti is negligible, the downstream node fault recovery processing time of each node shown in FIG. 1 is given in Table 1 as follows:

TABLE 1

| Node | a(32) | b(7) | c(6) | d(5) | e(1) (unit: ms) |
|---|---|---|---|---|---|
| TS | 250 | 10 | 40 | 40 | 250 |

Note that in Table 1 above, TS is the node fault recovery processing time.

As can be seen from Table 1 above, if the address values of the nodes are significantly separated from each other, the downstream node fault recovery time becomes a considerable overhead factor, and the communication efficiency of the network is decreased.

Still another embodiment of the present invention wherein the downstream node fault recovery processing is executed within a short period of time and the communication efficiency is improved as described below.

Figure 14:
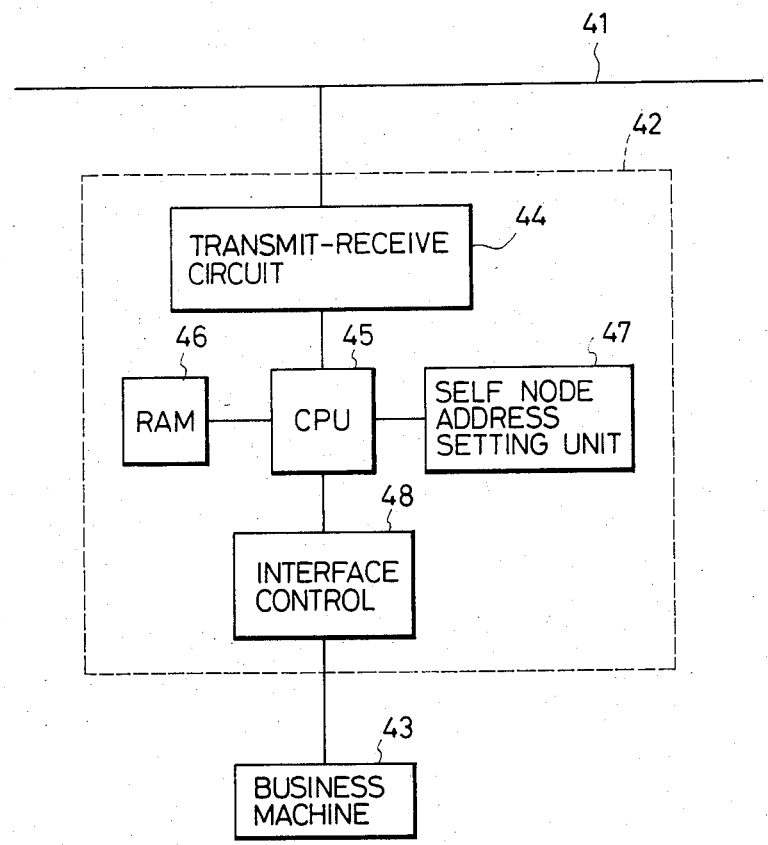
FIG. 14 is a block diagram showing another example of a transmit-receive device (node)

FIG. 14 is a block diagram showing the configuration of a node according to a third embodiment of the present invention. Referring to FIG. 14, various business machines 43 are connected to a transmit-receive node 42 which, in turn, is connected to a network communication link or path 41.

The node 42 has a transmit-receive circuit 44, a microprocessor (to be referred to as a CPU hereinafter) 45 which stores firmware inside and controls the overall node using the firmware, a random access memory (to be referred to as a RAM hereinafter) 46 for storing various data, a self node address setting unit 47 for setting the self node address, and an interface control 48 for performing input/output control of the business machines 43.

FIG. 15 shows memory areas allocated in the RAM 46.

A first downstream node discrimination flag a representing that the downstream node is discriminated is stored in an area Aa. A first downstream node address b representing the address of the discriminated downstream node is stored in an area Ab. A second downstream node discrimination flag c representing the downstream node next to the first downstream node is discriminated is stored in an area Ac. A second downstream node address d representing the address of the second downstream node next to the first downstream node is stored in an area Ad. The capital letters A, B, C and D at the left of the symbols of the respective areas represent the addresses in the RAM.

The area Ad for storing the second downstream node address d is used as a means for storing the destination address when the token is assigned to the first downstream node first and then the first node sends the token to the second downstream node.

FIG. 16 shows an example of the format of the communication data according to the third embodiment of the present invention. A communication control command such as a communication right assignment command (token) is written in a frame control (FC) field 55. A destination address is written in a destination address (DA) field 56. An address of a sending origin is written in a sending origin address (SA) field 57. Various data is written in a data field 58.

Figure 17:
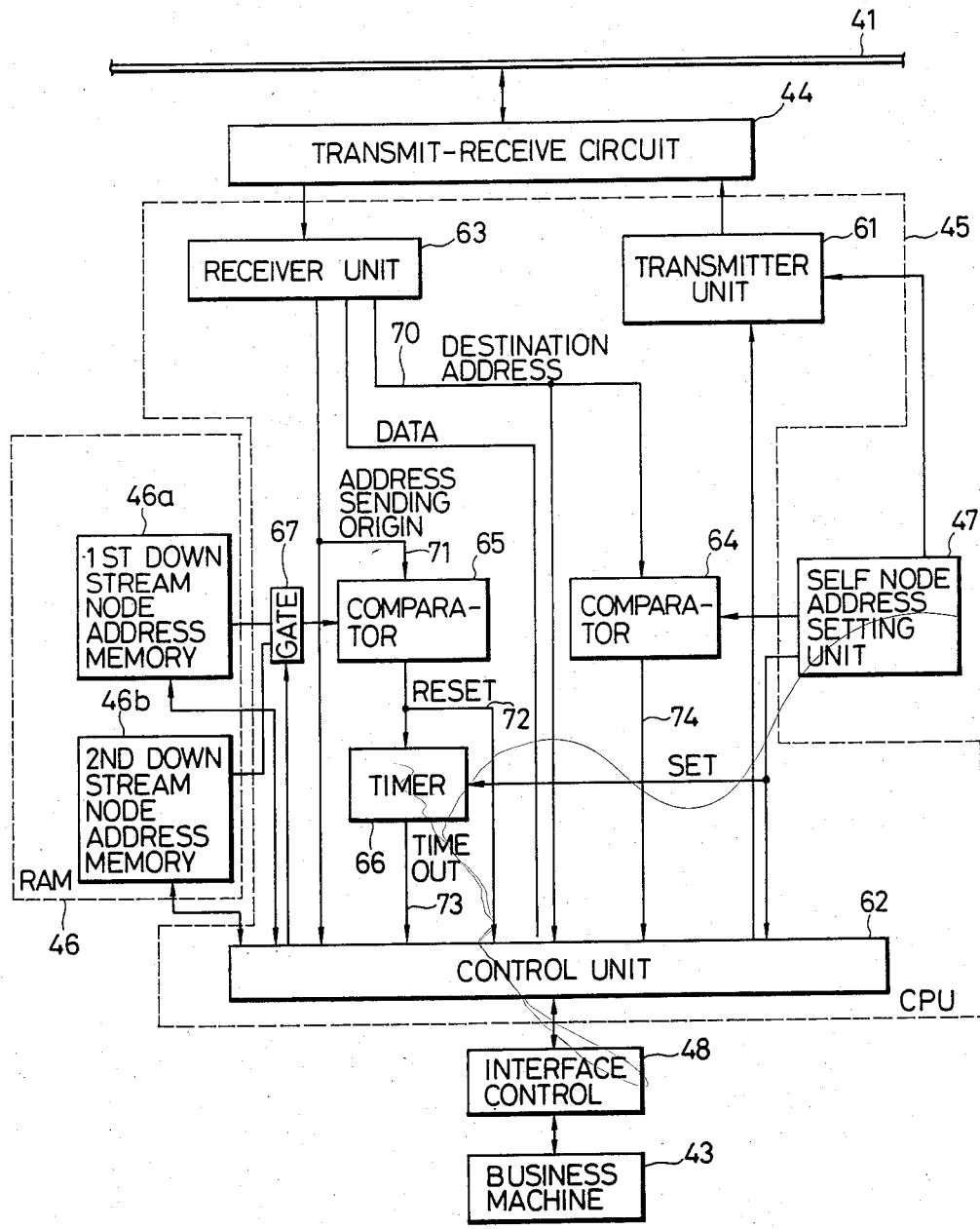
FIG. 17 is a block diagram for explaining the function of the transmit-receive device shown in FIG. 14.

FIG. 17 shows a functional block diagram of the node according to the third embodiment.

The same reference numerals as in FIG. 14 denote like components in FIG. 17, and a detailed description thereof will be omitted. A transmitter unit 61 transmits data in accordance with the format shown in FIG. 16. A control unit 62 performs various control operations to be described later. A receiver unit 63 receives data transmitted through a transmission link or path 41 via a transmit-receive circuit 44. A comparator 64 compares destination address data 70 received by the receiver unit 63 with preset address data set by a self node address setting unit 47. An output signal 74 from the comparator 64 represents that the data for the self node has been received. Thus, the control unit 62 determines that the self node has acquired the communication right (transmission right) in accordance with the signal 74. A comparator 65 generally compares sending origin address data 71 in the data received by the receiver unit 63 with address data stored in a first downstream node address memory 46a. However, in a special case of step S90 in the communication right assignment processing to be described later, the comparator 65 compares the sending origin address data 71 with address data stored in a second downstream node address memory 46b. An output signal 72 representing the coincidence of the inputs to the comparator 65 resets a timer 66 and is also supplied to the control unit 62. The control unit 62 performs the downstream node retrieval in accordance with the destination address received in synchronism with the signal 72 in the case of "adjacent node retrieval processing". The control unit 62 stores this destination address in the second downstream node address memory 46b as the second downstream node address.

The timer 66 produces a time out output 73 when the output signal 72 is not received from the comparator 65 within a predetermined period of time after the token is transmitted from the transmitter unit 61. The time out output 73 indicates that a fault has been caused in the first downstream node. Thus, the first and second downstream node address memories 46a and 46b of the RAM 16 store the node addresses of downstream nodes shown in FIG. 16. A gate 67 selects which one of the outputs from the memories 46a and 46b is to be supplied to the comparator 65. The gate 67 is controlled by the control unit 62 and normally receives the address data from the first downstream node address memory 46a.

The transmission processing according to the third embodiment will be described with reference to the communication right assignment processing flow chart shown in FIG. 18 and the downstream node retrieval processing flow chart shown in FIG. 19. The flow of the processing procedures shown in FIGS. 18 and 19 are stored in the control unit 62 as firmware.

In the normal state, the control unit 62 awaits for an input of a self node communication signal 74 from the comparator 65 upon reception of the token corresponding to the self node. When the destination address included in the token coincides with the preset value set by the self node address setting unit 47, it can be determined that the self node has acquired the communication right. When data is received, the control unit 62 receives the data. When there is a transmission request from one business machine 43 or the like, the control unit 62 prepares the transmission data in accordance with the request and sends the transmission data from the transmitter unit 61 onto the communication path 41 through the transmit-receive circuit 44.

Figure 18B:
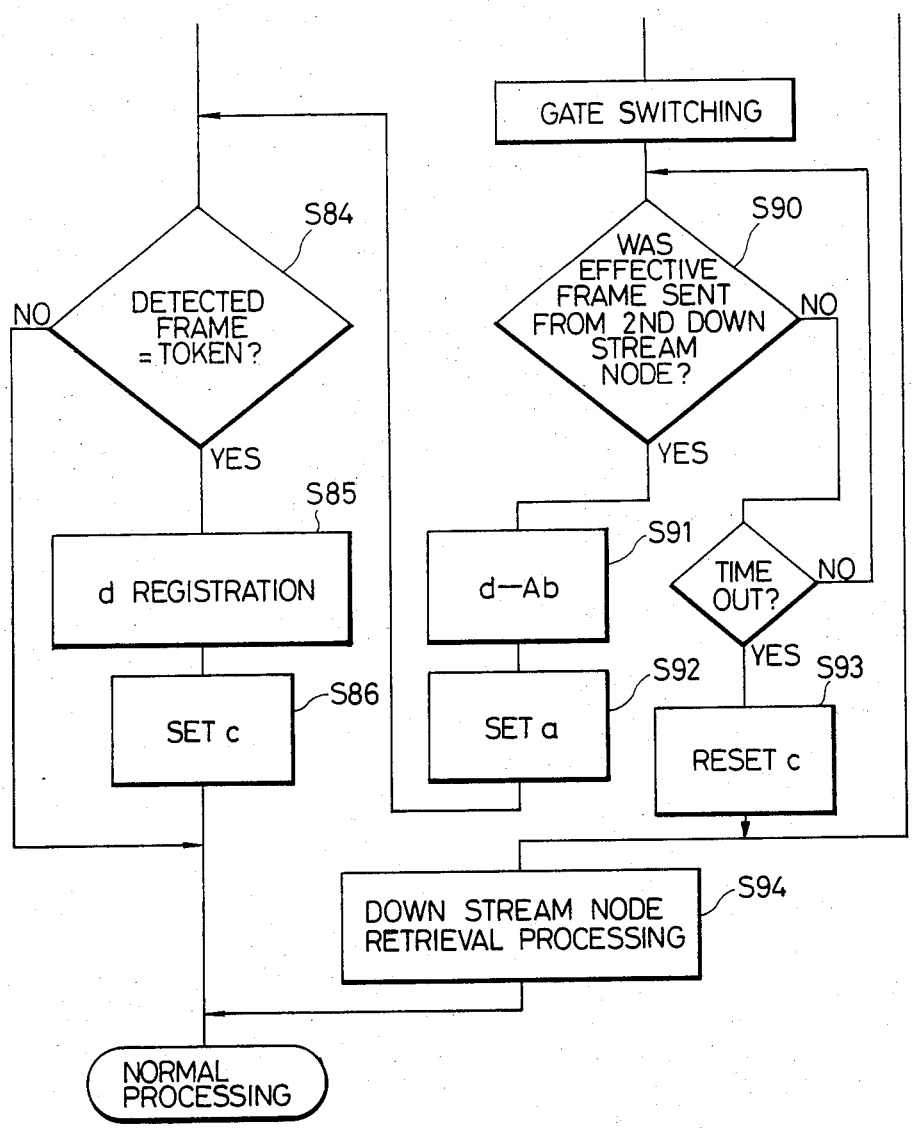
Figure 19:
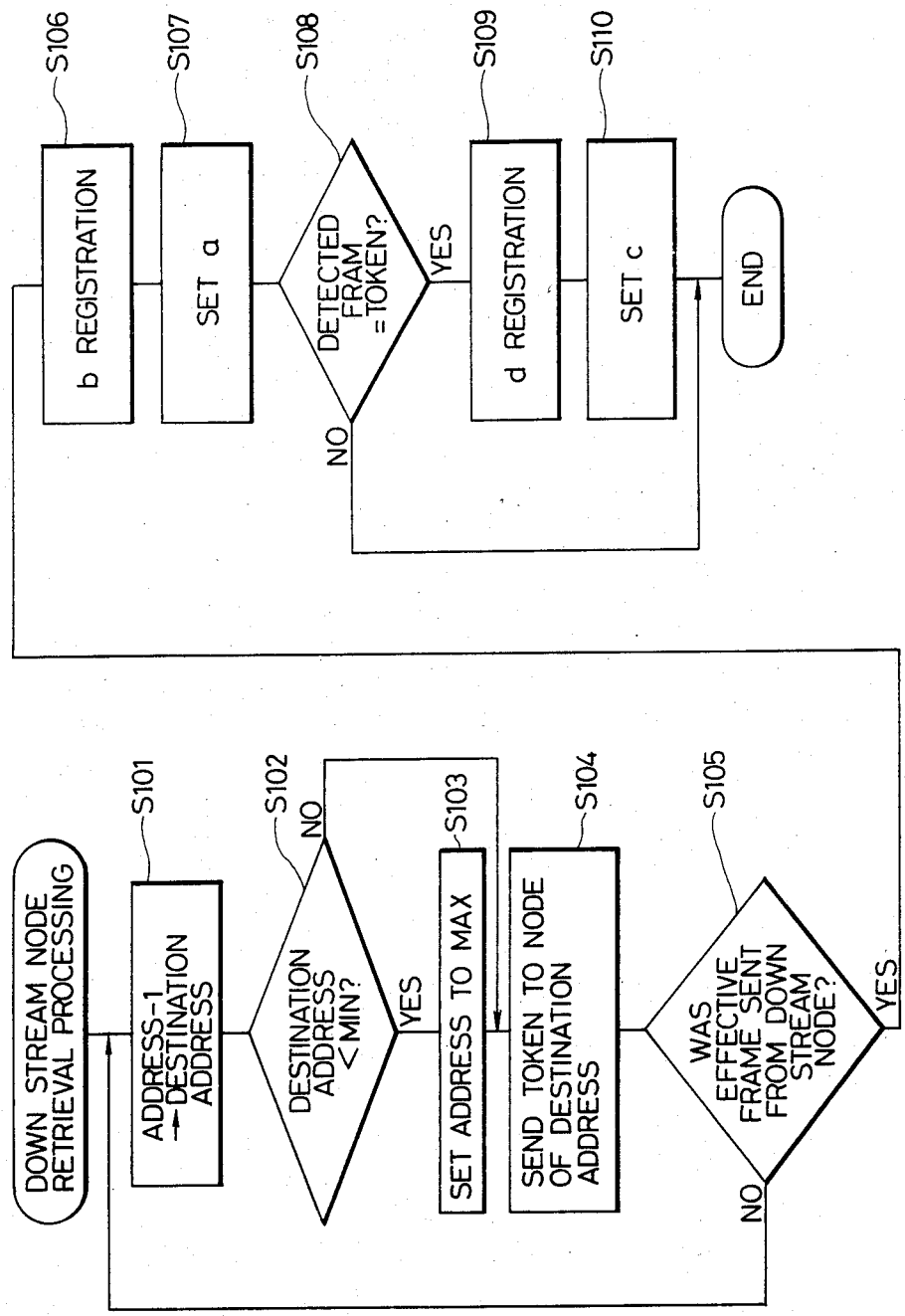
FIG. 19 is a flow chart showing an example of the downstream node retrieval processing in the embodiment shown in FIG. 14.

When another transmission request is not received after the current transmission processing is completed, the communication right assignment processing, as shown in FIG. 18, is performed so as to send the token to another downstream node.

Referring to FIG. 18, in step S81, the first downstream node discrimination flag a stored in the first downstream node address memory 46a is checked so as to determine if the node to receive the token is already registered. In certain cases, such as immediately after power is turned off, the first downstream node discrimination flag a is reset to "0". Therefore, the flow advances to step S94 to perform the downstream node retrieval processing. This processing is performed in accordance with the flow sequence shown in FIG. 19. Steps S101 to S105 in FIG. 19 are the same as steps S71 to S75 shown in FIG. 13, and a description thereof is therefore omitted. The time out output 73 from the timer 66 and the output signal 72 from the comparator 65 are monitored for retrieval. When the downstream node to receive the token is discriminated in step S105, the destination address at this time is stored as the first downstream node address b in the area Ab of the first downstream node address memory 46a (step S106). The first downstream node discrimination flag a is set to "1" (step S107).

When the frame returned from the downstream node is a token (step S108), the destination address of this frame is stored as the second downstream node address d in the area Ad of the second downstream node addresses memory 46b (step S109). The second downstream node discrimination flag c of the second downstream node address memory 46b is set to "1" (step S110). This corresponds to the destination address when the output signal 72 is produced from the comparator 65. When the frame received from the downstream node is not a token (step S108), this means that this downstream node has performed a transmission operation to another node. Therefore, the second downstream node address d is not discriminated at this time.

The communication right assignment processing after the first downstream node is discriminated will be explained below.

In step S81 in FIG. 18, the first downstream node discrimination flag a is determined to be set to "1". Therefore, the flow advances to step S82 wherein the token is transmitted to a node using the first downstream node address b as the destination address. Thereafter, the timer 66 is started to check if the token has been correctly received by the destination node. The frame returned from the first downstream node is monitored by the comparator 65 (step S83).

When an effective frame is returned from the first downstream node, the output signal 72 is produced to stop the timer 66 and to signal the reception of the effective frame to the control unit 62. The control unit 62 checks if the received frame is a token frame of communication right assignment (step S84). When the received frame is one of communication right assignment, the destination address of the frame is stored in the area Ad of the second downstream node address memory 46b as the second downstream node address d (step S85). The second downstream node discrimination flag c is set to "1" (step S86). When the returned frame is not a token frame of communication right assignment (step S84), the destination address of this frame may not represent the address (second downstream node address) of the node downstream the first downstream node. Therefore, in this case, the content of the second downstream node address storing area Ad is not updated. However, since it is impossible for the first downstream to always have a transmission request, the second downstream node discrimination flag c is generally set after several token transmission cycles.

Processing performed when the first downstream node is rendered inoperative due to power failure or the like will be described below.

In this case, the effective frame from the first downstream node is not detected within a predetermined period of time in step S83. Therefore, the time out output 73 is produced from the timer 66, and the flow goes to step S87. The first downstream discrimination flag a of the first downstream node address memory 46a is reset. Next, in step S88, the second downstream node discrimination flag c stored in the second downstream node address memory 46b is checked. If it is determined in step S88 that the flag c is set to "1", the flow advances to step S89. In this case, the token is transmitted through the transmitter unit 61 using as the destination address the second downstream node address d stored in the second downstream node address memory 46b. The timer 66 is also started. In order to check if the token is correctly assigned to the second downstream node, the address data from the second downstream node memory 46b is selected as the output from the gate 67, and the frame returned from the second downstream node is monitored (step S90).

When the effective frame from the second downstream node is detected, the output signal 72 from the comparator 65 is supplied to the control unit 62. In step S91, the second downstream node address d from the second downstream node address memory 46b is registered in the area Ab of the first downstream node address memory 46a. In step S92, the first downstream node discrimination flag a is set. The flow then returns to step S84. When the detected frame is a token frame, the second downstream node address storing area Ad and the second downstream node discrimination flag storing area Ac are updated in steps S85 and S86.

When the above processing is performed, the downstream node which was inoperative can be recovered to the operative state within a short period of time. Note that the recovery processing time described above does not depend upon the value of the address assigned to each node and is substantially constant.

When the second downstream node discrimination flag c is determined to be reset to "0" in step S88 or when the effective frame from the second downstream node is not detected within a predetermined period of time in step S90 (in this case, the time out signal 73 is produced from the timer 66 and the second downstream node discrimination flag c is reset to "0"; step S93), the flow sequence goes to step S94 as in the conventional case and the retrieval of a new downstream node is performed in accordance with the flow sequence shown in FIG. 19.

A third downstream node discrimination flag e and a third downstream node address f can be stored in the RAM 16. In this case, when the first and second downstream nodes are simultaneously rendered inoperative, the downstream node recovery processing can be performed following the same procedures as described above.

In this embodiment, the address of a downstream node next to the downstream node to which the token is to be assigned can be discriminated. Therefore, if the downstream node to which the token is to be assigned is rendered inoperative, the token can be assigned to the second downstream node. With this configuration, the downstream node recovery processing can be performed within a short period of time and the communication efficiency of the network can be improved.

The processing time required for the downstream node recovery processing as described above is independent of the address assigned to each node within the network. For this reason, the overall system configuration is flexible and can respond to various needs.

Moreover, if the node to which the token has been assigned does not return an effective frame within a predetermined period of time, the token is immediately assigned to a node which is next to and downstream of this first node. With this configuration, even if the node is rendered inoperative for some reason or is disconnected from the network, a data transmission control system does not perform retrieval of the addresses of all the other downstream nodes which wastes time but can recover the next node within a short period of time.

In the first, second and third embodiments described above, the node to which the token is to be assigned is retrieved by the adjacent node retrieval processing or the downstream node retrieval processing. Therefore, either type of such processing must be performed so as to perform assignment of the token.

Although either type of such processing allows discrimination of a small number of nodes, it does not allow quick discrimination of all the nodes connected in the network, which requires a long period of time. This is not practical. However, if all the nodes connected to the network are discriminated, designation/selection of destination for receiving data after acquisition of the token is facilitated.

Thus, when a node which has acquired the token wants to send data to another node, the destination address of the destination node is added to the data. In order to determine the destination address, some means must be provided such that each node can discriminate the system configuration of the network. In other words, each node must be able to discriminate the addresses of the nodes within the network to which it belongs.

Each node can discriminate the system configuration of the network by the following two methods (1) and (2):

(1) A monitor node for managing the overall system is provided in the network. The monitor node notifies the system configuration data to other nodes.

(2) Each node individually sends a state confirmation command to each of nodes having effective addresses except itself, and stores the addresses of the nodes which have returned responses to this command.

However, with the method (1), since the function is concentrated in a single monitor node, an auxiliary means for replacing the monitor node in case of failure thereof or the like, i.e., an additional means must be incorporated to guarantee reliable operation of the system. Furthermore, the method (1) is not basically suitable for a network such as an LAN which requires separate control. In addition, if a special monitor node must be added to a network of a small scale, the overall system becomes expensive.

With the method (2), discrimination of the system configuration requires a long period of time, resulting in a low system efficiency. For example, when the maximum total number of nodes is represented by N, the number of operative nodes is represented by n, the time required for an operative node to return a reply after reception of the state confirmation command is represented by T1, and the time out time set to discriminate an inoperative node is represented by T2, a processing time TS for discrimination of the system configuration is given by:

$$TS = \{(n-1)T1 + (N-n)T2\} \times n \quad (3)$$

where (N−1)T1 is the processing time for an operative node and (N−n)T2 is the processing time for an inoperative node.

According to the method (2), as may be seen from the equation (1), with an increase in the number of nodes, the time TS increases to an unacceptable level. From this, it may be concluded that the method (2) can hardly be applied to a network of a large scale.

An embodiment of a transmission system wherein each node can efficiently discriminate the nodes constituting a network to which it belongs will be described below.

Figure 20:
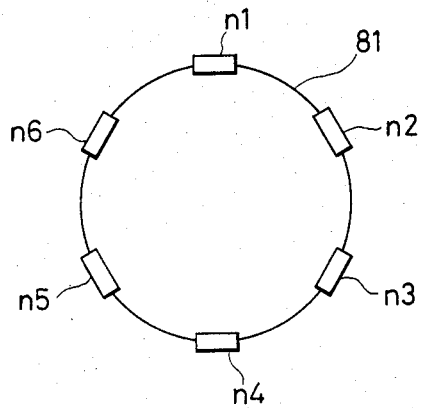
FIG. 20 is a diagram showing another example of another LAN.

FIG. 20 shows an example of the configuration of an LAN according to the network control system according to the present invention. Nodes n1 to n6 are connected through a ring network transmission link or path 81. Note that the numerals attached at the right of each symbol representing the node represent the addresses of the corresponding nodes.

Figure 21:
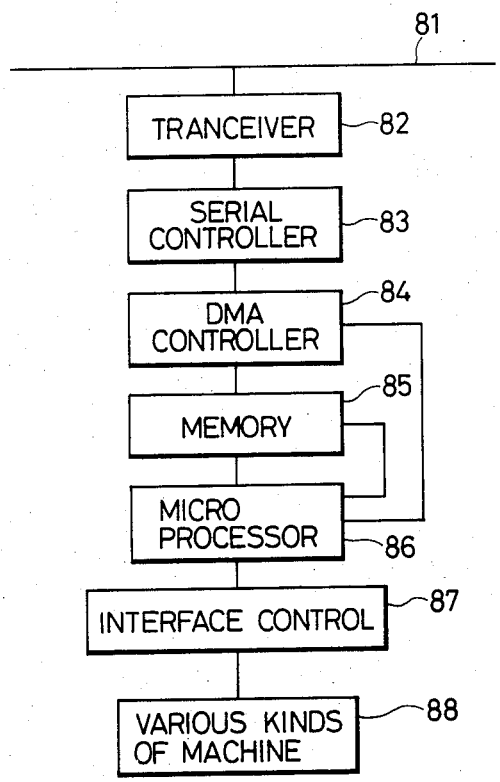
FIG. 21 is a block diagram showing an example of the configuration of each node shown in FIG. 20.

FIG. 21 is a block diagram shown an example of the configuration of a node used in the network shown in FIG. 20. A transceiver 82 exchanges signals with the network transmission path 81. A serial controller 83 is connected to the transceiver 82 and functions as an interface between the node and the path 81 in accordance with the data transmission scheme of the data, on the path 81. Communication data such as an address of another node, transmitted through the path 81 is transferred to a DMA controller 84 through the transceiver 82 and the serial controller 83. The received data is then stored in a memory 85. A microprocessor 86 stores firmware therein for controlling the overall node. An interface control unit 87 is connected to the microprocessor 86 so as to perform input/output control of various kinds of machine 88.

Figure 22:
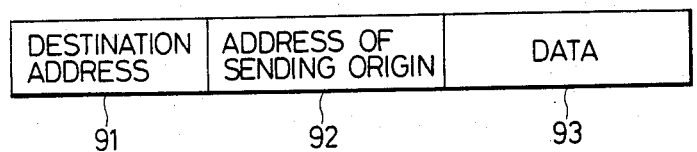
FIG. 22 shows the format of communication data.

FIG. 22 shows an example of the data format used in the network control system according to the present invention. The format has a destination address field 91, a sending origin address field 92, and a data field 93 for storing control data, such as a communication control command and various data.

The node address management processing according to this embodiment of the present invention will be described with reference to FIGS. 23, 24 and 25. In the network shown in FIG. 20, it is assumed that the nodes n1 to n5 are in the operative state, the power of the node n6 is not yet turned on and the node n6 is therefore inoperative.

Figure 23:
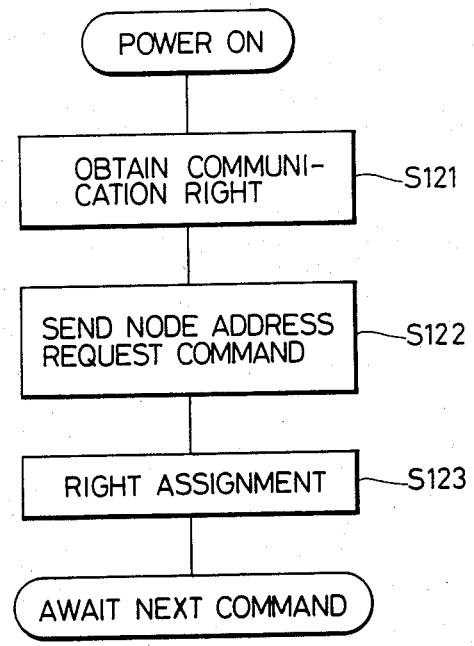
FIGS. 23, 24 and 25 are flow charts showing examples of node address management processing in the nodes shown in FIG. 20.
Figure 24:
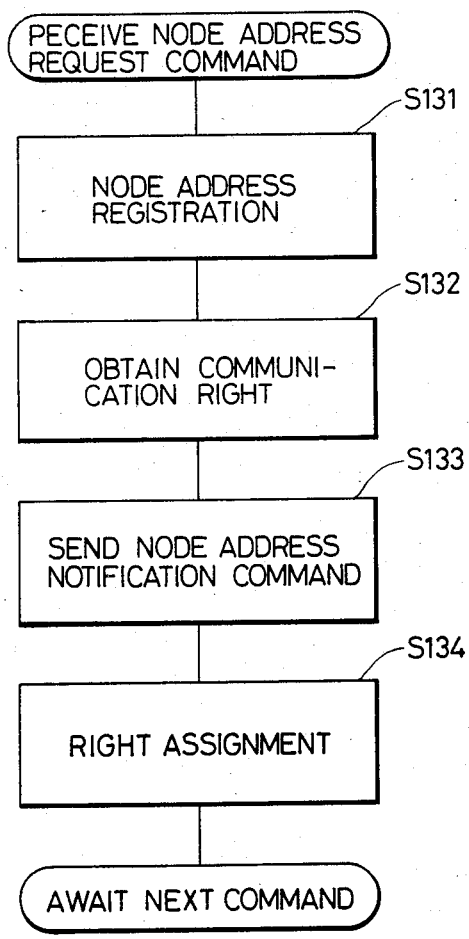

FIG. 23 shows the control sequence when the power of the node n6 is turned on. When the power of the node n6 is turned on, the node n6 waits for a communication right (token) to be sent. When the communication right assignment command is detected in steps S121 in the data field 93 of the communication data received, the node n6 sends a node address request command to all the other nodes n1 to n5 in the network, in step S122. This transmission can be performed by a single transmission operation in accordance with the following procedures. All "1" data is set to prepare a global destination address 91. The address of the self node is used as a sending origin address (the address of the node n6 in this case).

After this transmission operation is completed, in step S123, the node n6 sends the communication right assignment command to the adjacent node, that is, the node n1 in the manner as described above and assigns the communication right to this node. Thereafter, the node n6 awaits a node address notification command sent from another node.

Processing performed when each of the other nodes n1 to n5 has received the node address will be described with reference to FIG. 24. Each of the nodes n1 to n5 which has received the node address request command is thus notified that the node n6 having the address indicated in the address field 92 in the communication data shown in FIG. 22 has been added to the network. Then, in step S31, each node (n1 to n5) registers the address of the node n6 in the corresponding memory 85 in step S131.

When one of the nodes n1 to n5 obtains the communication right upon reception of the communication right assignment command in step S132, it sends the node address notification command to all the other nodes in the network in step S133. As in the case of the node address request command transmission by the node n6, the global address is used as the destination address. When this transmission processing is terminated, the node sends the communication right assignment command to the next node in step S134, and then awaits another command thereafter.

In this manner, the nodes n1 to n5 in the network can discriminate the address of the node n6 which is added to the network and can notify their self node addresses to this new node n6.

Figure 25:
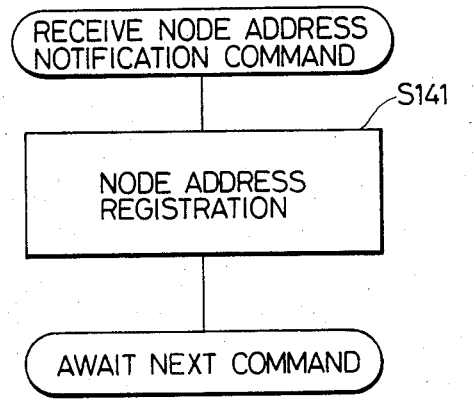

Meanwhile, the node which has received the node address notification command registers the node address in accordance with the sending origin address in the communication data in step S141 shown in FIG. 25.

This address management operation will be summarized for the case of the node n6 which is added to the network. Every time the communication right is assigned in the order of nodes n1, n2, n3, n4 and n5 after the node n6 sends the node address request command, each node sends the node address notification command. Therefore, when the node address command from each node is received, the node n6 can discriminate the addresses of all the nodes within the network, that is, "1" to "5".

On the side of the nodes n1 to n5, when the node address request command is returned from the node n6, it can be determined that the node n6 has been added to the network.

In this manner, while the communication right is circulated within the network, each node can discriminate the system configuration of the network. Therefore, the communication efficiency of the network can be improved. Since each node can discriminate the system configuration of the network without requiring the use of a special monitor node in the network, the network system can be rendered inexpensive.

The above embodiment is exemplified by a ring network. However, this embodiment can be similarly applied to a network which allows uniform circulation of the communication right assignment command through all the nodes connected to the network. Therefore, this embodiment can, for example, be applied to a bus network as shown in FIG. 2.

Figure 26:
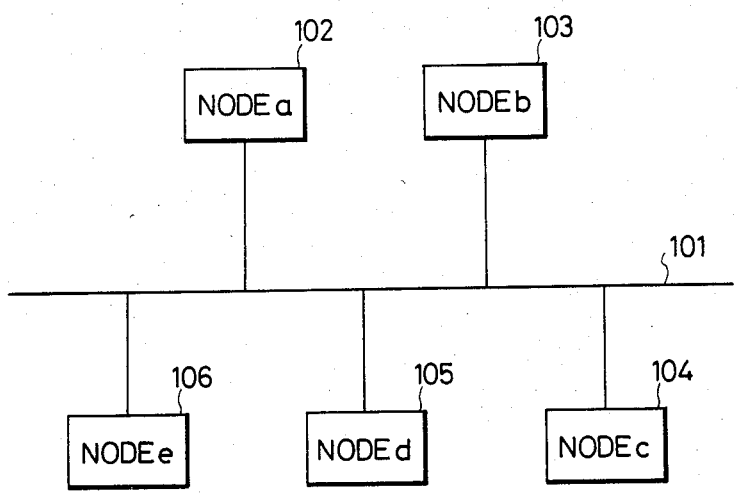
FIG. 26 is a diagram showing an example of an LAN system.

FIG. 26 shows the system configuration of an LAN according to still another embodiment of the present invention. Nodes a (102), b (103), c (104), d (105) and e (106) are connected to a bus network communication link or path 101. Note that the numerals in the symbols representing the nodes denote the addresses assigned to the respective nodes.

Figure 27:
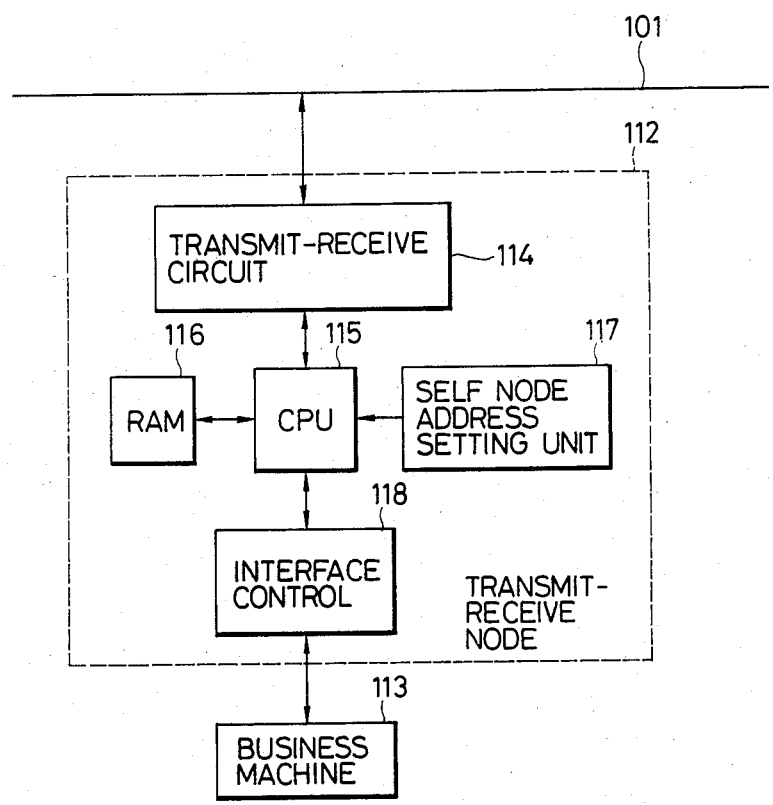
FIG. 27 is a block diagram showing the configuration of a transmit-receive device (node) shown in FIG. 26.

FIG. 27 is a block diagram showing the configuration of the node shown in FIG. 26. Various kinds of machine 113 are connected to the path 101 through a transmit-receive node 112.

The node 112 has a transmit-receive circuit 114, a microprocessor (to be referred to as a CPU hereinafter) 115 which stores firmware and controls the overall node in accordance with this firmware, a random access memory (to be referred to as a RAM hereinafter) 116 for storing various data, a self node setting unit 117 for designating the self node, and an interface control unit 118 for performing input/output control of the machines 113.

FIG. 28 shows memory areas allocated in the RAM 116. A node total count a representing the total number of discriminated nodes to be described later is stored in an area Aa. Addresses of the discriminated nodes are stored in areas Ab1 to Abn in the form of a first node address b1, a second node address b2, a third node address b3, . . . , an nth node address bn. A table consisting of these areas Ab1 to Abn will be referred to as a "system configuration table TBL" hereinafter. The respective areas in the RAM 116 have the start addresses A, B1 to Bn.

FIG. 29 shows an example of the format of the communication data used in the LAN according to this embodiment. The data format has a destination address field 121, a sending origin address field 122, and a data field 123 storing various communication control commands and data.

Figure 30:
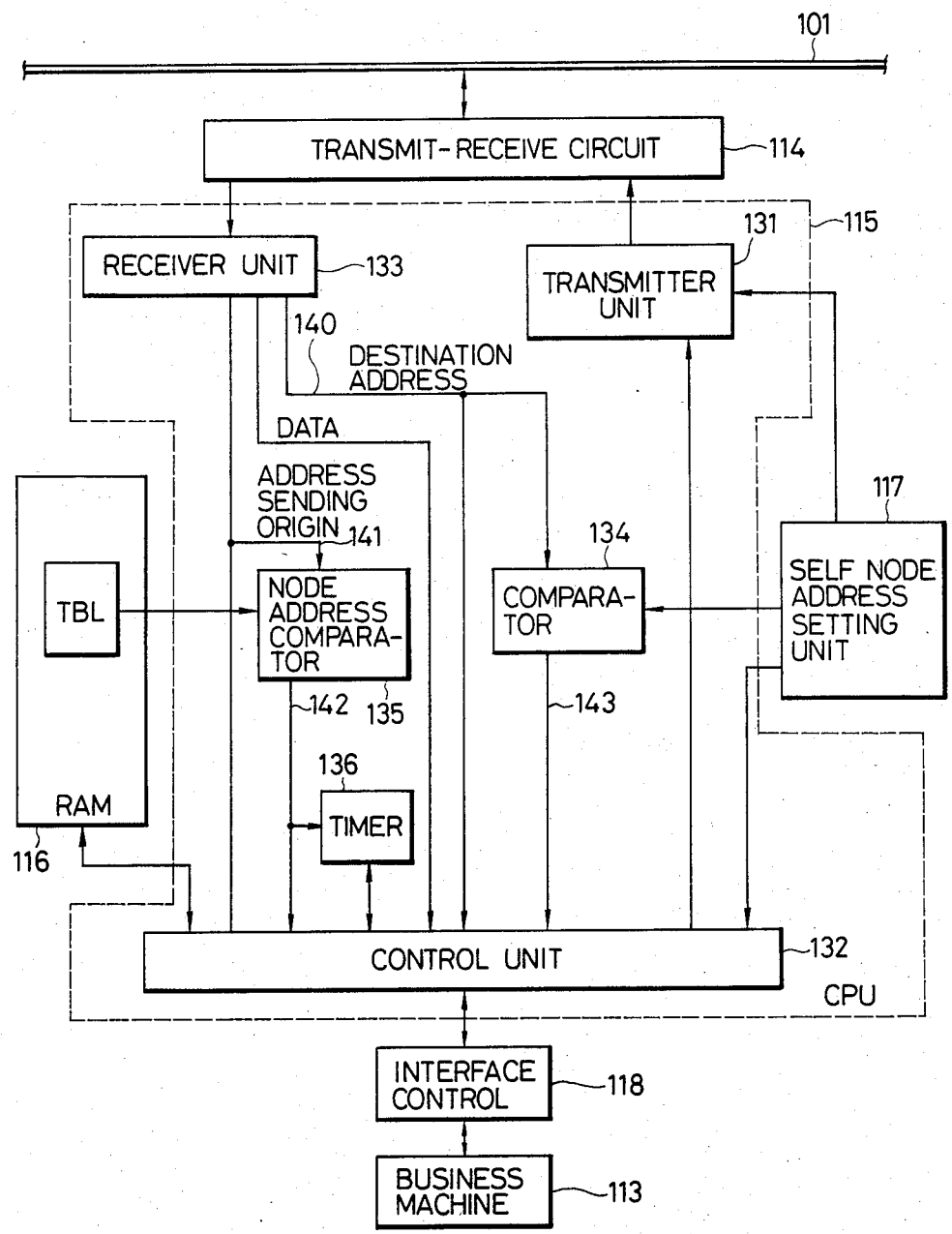
FIG. 30 shows a functional block diagram of the device shown in FIG. 27.

FIG. 30 shows a block diagram showing the functions of the mode according to this embodiment.

The same reference numerals as in FIG. 27 denote like components in FIG. 30, and a detailed description thereof will be omitted. A transmitter unit 131 transmits transmission or communication data in accordance with the format shown in FIG. 29. A control unit 132 performs various control operations to be described later. A receiver unit 133 receives the data transmitted through a transmit-receive circuit 114 via a communication path 101. A comparator 134 compares destination address data received by the receiver unit 133 with a preset address data preset by a self node address setting unit 117. An output signal 143 from the comparator 134 represents that the data intended for the self node has been received. The control unit 132 determines if the data frame destined for the self node has been received, in accordance with the output signal 143. A node address comparator 135 compares sending origin address data 141 received by the receiver unit 133 with the address of the node in the system configuration table TBL (FIG. 28) in the RAM 116. When it is determined that a sending origin address which is not registered in the table TBL has been received in accordance with comparison by the node address comparator 135, a noncoincidence signal 142 is supplied to the control unit 132.

When the noncoincidence signal 142 is received, the control unit 132 stores the sending origin address data of the currently received data in the table TBL of the RAM 116 as the address of a new node. At the same time, a counter 136 is counted up by one. The updated count of the counter 136 indicates the total number of nodes having addresses stored in the table TBL.

Figure 31:
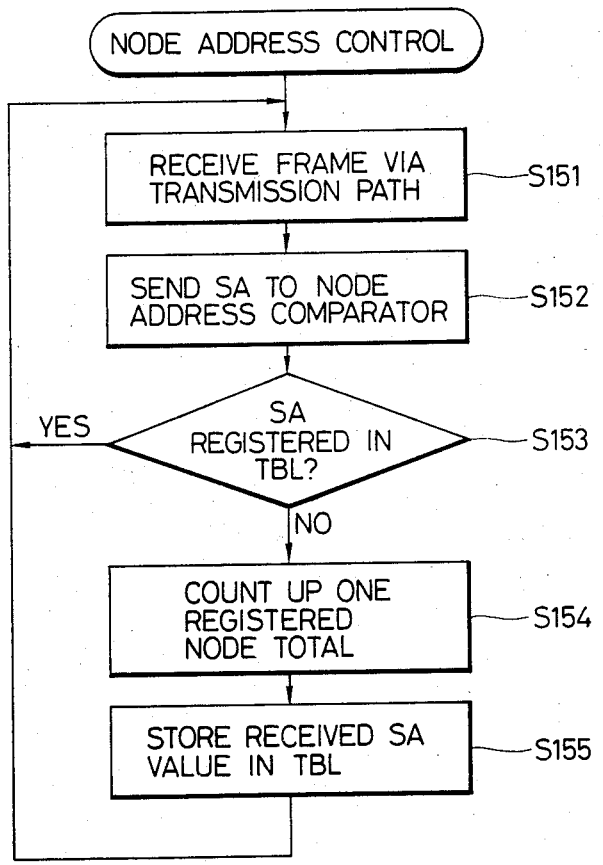
FIG. 31 is a flow chart showing an example of the node address management processing in the device shown in FIG. 30.

The mode of operation of this embodiment will now be described with reference to the node address management processing flow chart shown in FIG. 31.

The control unit 132 normally awaits reception of the data frame addressed to itself, that is, the signal 143 from the comparator 134 destined itself. When the signal 143 is received, the control unit 132 receives the corresponding data frame. When there is a transmission request from a machine 113 or the like, the control unit 132 causes the transmitter unit 131 to send the transmission data onto the communication path 101 through the transmit-receive circuit 114.

Separate from this, the control unit 132 normally receives the data frame on the communication path 101 irrespective of the corresponding destination address and monitors the sending origin address in the received data frame and the node address stored in the table TBL in the RAM 116 by means of the node address comparator 135. The node management processing for performing this address monitoring will be described based on the flow chart shown in FIG. 31.

The receiver unit 133 in the CPU 115 of the node 112 awaits reception of a normal frame through the communication path 101. When a normal frame is received in step 151, a sending origin address SA of this frame is supplied to the node address comparator 135 through the signal line 141 in tep S152. In step 153, the node address comparator 135 checks if the sending origin address from the signal line 141 is registered in the system configuration table TBL in the RAM 116.

If NO in step 153, the flow sequence advances to tep S154. The noncoincidence signal 142 is produced from the node address comparator 135, and the registered node total number counted by the counter 136 increases by one. In response to the noncoincidence signal 142, the control unit 132 stores the received sending origin address in the table TBL of the RAM 116 in step 155. At the same time, the control unit 132 counts up the node total count a in the TBL by one as in the case of the counter 136. The control unit 132 then awaits the reception of the frame.

However, if YES is indicated in step S153, no processing is performed and the next frame reception is awaited.

The area in the RAM 116 for storing the address SA is determined in the following manner. When the node total count a is 1, the address SA is stored in the area Ab1 of the first node address b1, and so on. Finally, when the node total count is n, the address SA is stored in the area Abn of the nth node address bn.

Note that the counter 136 and the node total count a are initialized to "0" immediately after the node power is turned on.

The node addresses of the nodes in the network are sequentially stored in the system configuration table TBL in this manner. Therefore, each node can discriminate the node addresses in the network by referring to this system configuration table TBL. Each node can further discriminate the total number of nodes connected to the network by referring to the node total count a.

Typical access methods to a transmission medium (transmission or communication path) include the CSMA/CD (Carrier Sense Multiple Access with Collision Detection) system and the Token Passing system. However, it is to be noted that either of these systems may be used in a data transmission system according to the present invention.

In this manner, a data transmission control system is provided wherein each node can discriminate the system configuration of the network without using a special communication control command, easy system reconstruction can be performed immediately upon failure, disconnection or power failure of a node, and the communication efficiency of the network is improved.

Since each node can discriminate the system configuration of the network without requiring the use of a special monitor node, the network system can be constructed at low cost.

What is claimed is:

1. A data transmission system including a plurality of nodes connected to each other through a transmission line, wherein only a node to which a communication right has been assigned is permitted to perform data transmission between that node and another node of the remaining plurality of nodes, wherein each of said plurality of nodes comprises:

means for retrieving another node of said plurality of nodes to which the communication right is to be assigned;

means for storing information representative of said another node retrieved by said retrieving means;

means for assigning the communication right to said another node according to the information stored in said means for storing; and means for varying an execution frequency of the node retrieving operation of said retrieving means in accordance with operating conditions of said plurality of nodes.

2. A system according to claim 1, wherein said assigning means is operable to reassign the communication right to a node a plurality of times according to information stored in said node, without repeatedly performing the node retrieving operation.

3. A system according to claim 1, wherein said varying means is operable to differentiate the execution frequency of the node retrieving operation between the time of an initial retrieving operation of a node and the time of a retrieval operation of said another node to which the communication right is to be assigned.

4. A system according to claim 3, wherein said varying means is operable to provide a higher execution frequency of the node retrieving operation at the time of an initial retrieving operation of a node.

5. A system according to claim 1, wherein said varying means is operable to vary the execution frequency of the node retrieving operation in accordance with the number of node retrieving operations to be performed.

6. A system according to claim 1, wherein said varying means is operable to repeatedly change the execution frequency of the node retrieving operation.

7. A system according to claim 1, wherein each of said plurality of nodes has an address associated therewith, and said retrieving means is operable to transmit a predetermined command which sequentially changes the address of said another node to which the communication right is to be assigned and to perform a node retrieving operation by means of discriminating as a function of the presence or the absence of a response to the command.

8. A system according to claim 7, wherein said storage means stores the address of said another node retrieved by said retrieving means.

9. A system according to claim 1, wherein said plurality of nodes are bus-connected through the transmission line.

10. A data transmission system including a plurality of nodes, each having an address associated therewith, connected to each other through a transmission line, wherein only a node to which a communication right has been assigned is permitted to perform data transmission between that node and another node, wherein each of said plurality of nodes comprises:

means for obtaining an address of another node of said plurality of nodes, to which the communication right is to be assigned;

means for transmitting a command, indicating that the communication right is to be assigned to said another node corresponding to the address obtained by said obtaining means, to such another node;

means for assigning the communication right, upon receipt of a response to the command, to said another node which has responded to the command; and means for causing said obtaining means to again perform the address obtaining operation and for causing said transmitting means to again perform the command transmission operation, in the absence of a response to the command;

wherein if the address of said another node, which is obtained by said obtaining means has a predetermined first address, at least one of said other plurality of nodes is operable to transmit the command through said transmitting means to a node having a predetermined second address instead of the obtained address.

11. A system according to claim 10, wherein at least one of said plurality of nodes includes means for arbitrarily setting the first address.

12. A system according to claim 10, wherein said obtaining means is operable to obtain the address of another node to which the communication right is to be assigned by means of sequentially adding a predetermined value to the address of the node to which the communication right has been assigned.

13. A system according to claim 10, wherein said first address is a maximum value address among the addresses of said plurality of nodes, and said second address is a minimum value address among the addresses of said plurality of nodes.

14. A system according to claim 10, wherein said plurality of nodes are bus-connected through the transmission line.

15. A data transmission system including a plurality of nodes, each having an address associated therewith, connected to each other through a transmission line, wherein only a node to which a communication right has been assigned is permitted to perform data transmission between that node and another node of said plurality of nodes, wherein each of said plurality of nodes comprises:

means for transmitting a command indicating that the communication right will be assigned to said another node corresponding to an address which is associated with the respective address of each said node;

means for assigning the communication right, upon receipt of a response to the command, to said another node which has responded to the command; and means for identifying an address of said another node to which the communication right is assigned from the node of which the address is associated with the respective address of each said node;

wherein in case of no response to the command, the node is operable to transmit the command through said transmitting means to said another node having the address identified by said identifying means.

16. A system according to claim 15, wherein each of said plurality of nodes further comprises means for obtaining an address of said another node, to which the communication right is to be assigned, based on the respective address of each said node, and said transmitting means transmits the command to said another node corresponding to the address obtained by said obtaining means.

17. A system according to claim 15, wherein in the absence of a response to the command within a predetermined time, said transmitting means is operable to transmit the command to said another node corresponding to address identified by said identifying means.

18. A system according to claim 15, wherein said identifying means is operable to take in data transmitted on said transmission line, and to identify the address of said another node based on the data taken in.

19. A system according to claim 15, wherein each of said plurality of nodes further comprises means for storing the address identified by said identifying means.

20. A system according to claim 15, wherein said plurality of nodes are bus-connected through the transmission line.

21. A data transmission system including a plurality of nodes, connected to each other through a transmission line, wherein only a node to which a communication right has been assigned is permitted to perform data transmission between that node and another node, wherein each of said plurality of nodes comprises:

means for assigning the communication right to another node of said plurality of nodes, having an address which is associated with the respective address of each said node;

means for transmitting, to all of the other nodes of said plurality of nodes, a command indicating that address information is required, in the event that the communication right is first assigned to each said another node; and means for informing the node which transmitted said command, of each said node address, in the event that the communication right is assigned from each said another node after receipt of said command.

22. A system acording to claim 21, wherein each of said plurality of nodes further comprises means for storing therein the node addresses obtained from said informing means.

23. A system according to claim 21, wherein each of said plurality of nodes further comprises means for recognizing the establishment of a connection of a node with the transmission line through receipt of said command.

24. A system according to claim 21, wherein each of said plurality of nodes further comprises means for obtaining an address of another node, to which the communication right is to be assigned, based on a respective address of each said node, and said assigning means is operable to assign the communication right to another node of which the address is obtained by said obtaining means.

25. A system according to claim 21, wherein said plurality of nodes are bus-connected through the transmission line.

26. A data communication system including a plurality of nodes, each having an associated address, connected to each other through a transmission line, wherein data transmission is carried out between the nodes, wherein each of said plurality of nodes comprises:

means for transmitting data, including data pertaining to the address of of each of said plurality of nodes, to another node;

means for receiving in the address included in the data transmitted on said transmission line; and means for recognizing the nodes connected to said transmission line based on the address received by said means for receiving.

27. A system according to claim 26, wherein each of said plurality of nodes is operable and receives the address included in the data on said transmission line, by said receiving means, even if such data is not directed to any one particular node.

28. A system according to claim 26, wherein each of said plurality of nodes further comprises means for storing the address received by said receiving means.

29. A system according to claim 26, wherein said recognizing means is operable to recognize the number of nodes connected to said transmission line.

30. A system according to claim 26, wherein said plurality of nodes are bus-connected through the transmission line.

* * * * *